(12) United States Patent
Kuechler et al.

(10) Patent No.: US 7,741,526 B2
(45) Date of Patent: Jun. 22, 2010

(54) FEEDSTOCK PREPARATION OF OLEFINS FOR OLIGOMERIZATION TO PRODUCE FUELS

(75) Inventors: Keith H. Kuechler, Friendswood, TX (US); Stephen H. Brown, Bernardsville, NJ (US); Marc P. Puttemans, Schepdaal (BE); Steven E. Silverberg, Seabrook, TX (US); An A. Verberckmoes, Serskamp (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 577 days.

(21) Appl. No.: 11/489,114

(22) Filed: Jul. 19, 2006

(65) Prior Publication Data

US 2008/0287717 A1   Nov. 20, 2008

(51) Int. Cl.
C01L 1/16 (2006.01)
(52) U.S. Cl. .............................. 585/17; 585/14; 585/16; 208/14; 208/15; 208/16
(58) Field of Classification Search ............. 208/14–17; 585/14, 16–17, 502
See application file for complete search history.

(56) References Cited

U.S. PATENT DOCUMENTS

| | | | |
|---|---|---|---|
| 3,926,782 A | 12/1975 | Plank et al. | |
| 4,025,575 A | 5/1977 | Chang et al. | |
| 4,211,640 A * | 7/1980 | Garwood et al. | 208/255 |
| 4,444,988 A | 4/1984 | Capsuto et al. | |
| 4,456,781 A | 6/1984 | Marsh et al. | |
| 4,504,693 A | 3/1985 | Tabak et al. | |
| 4,544,792 A | 10/1985 | Smith et al. | |
| 4,547,612 A | 10/1985 | Tabak | |

(Continued)

FOREIGN PATENT DOCUMENTS

EP   0 916 716   5/1999

(Continued)

OTHER PUBLICATIONS

Romannikov, V.N. et al (1985). React. Kinet. Catal. Lett. 27(1), 27-31.*

(Continued)

*Primary Examiner*—Robert J Hill, Jr.
*Assistant Examiner*—Brian McCaig
(74) *Attorney, Agent, or Firm*—Kevin M. Faulkner; David M. Weisberg

(57) ABSTRACT

A feedstock containing at least 1 wt % butenes, at least 1 wt % pentenes, at least 1 wt % hexenes, at least 10 wppm $C_4$ dienes, at least 10 wppm $C_5$ dienes, and optionally at least 10 wppm $C_6$ dienes can be selectively hydrogenated over a catalyst (e.g., a noble metal) to form a stream containing 100 wppm to 4000 wppm total dienes. The hydrogenated stream, and an olefinic recycle stream having less than 10 wt. % $C_{1+}$ moieties, can be contacted with a molecular sieve catalyst, e.g., at a recycle to feed ratio between 0.1 and 3.0, at a WHSV of at least 1.0 based on olefin in the feed, and at a reactor $\Delta T$ no greater than 40° F. (22° C.), thus forming a reaction product that can then be separated into a distillate, e.g., having from 1 wt % to 30 wt % non-normal $C_9$ olefins, and the aforementioned olefinic recycle stream.

32 Claims, 5 Drawing Sheets

U.S. PATENT DOCUMENTS

| | | | |
|---|---|---|---|
| 4,547,616 A * | 10/1985 | Avidan et al. | 585/640 |
| 4,579,999 A * | 4/1986 | Gould et al. | 585/312 |
| 4,677,243 A | 6/1987 | Kaiser | |
| 4,720,600 A | 1/1988 | Beech, Jr. et al. | |
| 4,740,645 A | 4/1988 | Garwood et al. | |
| 4,777,316 A | 10/1988 | Harandi et al. | |
| 4,788,366 A | 11/1988 | Harandi et al. | |
| 4,822,477 A | 4/1989 | Avidan et al. | |
| 4,831,203 A | 5/1989 | Owen et al. | |
| 4,831,204 A | 5/1989 | Kushnerick et al. | |
| 4,834,949 A | 5/1989 | Owen et al. | |
| 4,851,602 A | 7/1989 | Harandi et al. | |
| 4,855,524 A | 8/1989 | Harandi et al. | |
| 4,859,308 A | 8/1989 | Harandi et al. | |
| 4,868,146 A | 9/1989 | Chu et al. | |
| 4,873,385 A | 10/1989 | Avidan et al. | |
| 4,873,389 A | 10/1989 | Avidan et al. | |
| 4,877,921 A | 10/1989 | Harandi et al. | |
| 4,879,428 A | 11/1989 | Harandi et al. | |
| 4,899,014 A | 2/1990 | Avidan et al. | |
| 4,919,896 A | 4/1990 | Harandi et al. | |
| 4,939,314 A | 7/1990 | Harandi et al. | |
| 4,942,021 A | 7/1990 | Garwood et al. | |
| 4,966,680 A | 10/1990 | Avidan et al. | |
| 5,019,357 A | 5/1991 | Harandi et al. | |
| 5,034,565 A | 7/1991 | Harandi et al. | |
| 5,043,499 A | 8/1991 | Harandi et al. | |
| 5,057,640 A | 10/1991 | Chang et al. | |
| 5,063,187 A | 11/1991 | Burgfels et al. | |
| 5,146,032 A | 9/1992 | Harandi | |
| 5,177,279 A | 1/1993 | Harandi | |
| 5,210,347 A | 5/1993 | Chen et al. | |
| 5,234,875 A | 8/1993 | Han et al. | |
| 6,169,218 B1 * | 1/2001 | Hearn et al. | 585/260 |
| 6,469,223 B2 | 10/2002 | Kelly et al. | |
| 6,548,721 B1 * | 4/2003 | Mc Culloch et al. | 585/277 |
| 6,646,176 B1 | 11/2003 | Dath et al. | |
| 6,673,978 B2 | 1/2004 | Coute' et al. | |
| 6,723,889 B2 | 4/2004 | Miller et al. | |
| 2001/0001803 A1 | 5/2001 | Hubbard et al. | |
| 2002/0020107 A1 | 2/2002 | Bailey et al. | |
| 2003/0085153 A1 | 5/2003 | O'Rear | |
| 2003/0116469 A1 | 6/2003 | Hemighaus et al. | |
| 2004/0068923 A1 | 4/2004 | O'Rear et al. | |
| 2004/0148850 A1 | 8/2004 | O'Rear et al. | |
| 2004/0149626 A1 | 8/2004 | O'Rear et al. | |
| 2004/0152792 A1 | 8/2004 | O'Rear et al. | |
| 2004/0152930 A1 | 8/2004 | O'Rear et al. | |
| 2005/0282038 A1 | 12/2005 | Yamamoto et al. | |

FOREIGN PATENT DOCUMENTS

| | | |
|---|---|---|
| EP | 0 742 195 | 9/2000 |
| EP | 0 882 692 | 7/2001 |
| EP | 1 249 486 | 10/2002 |
| EP | 1 359 207 | 5/2003 |
| EP | 1 013 744 | 4/2006 |
| WO | 00/20534 | 4/2000 |
| WO | WO 00/20534 | 4/2000 |
| WO | WO 00/20535 | 4/2000 |
| WO | WO 01/19762 | 3/2001 |
| WO | WO 01/49812 | 7/2001 |
| WO | WO 01/62875 | 8/2001 |
| WO | 02/04575 | 1/2002 |
| WO | WO 02/04575 | 1/2002 |
| WO | WO 03/104361 | 12/2003 |
| WO | WO 2004/009518 | 1/2004 |
| WO | 2004/016572 | 2/2004 |
| WO | 2004/018089 | 3/2004 |
| WO | WO 2004/033512 | 4/2004 |
| WO | WO 2004/048299 | 6/2004 |
| WO | WO 2005/017071 | 2/2005 |
| WO | WO 2005/023423 | 3/2005 |
| WO | 2006/033759 | 3/2006 |
| WO | WO 2006/033759 | 3/2006 |

OTHER PUBLICATIONS

U.S. Appl. No. 11/342,000, filed Jan. 27, 2006, Kuechler et al.
U.S. Appl. No. 11/342,365, filed Jan. 27, 2006, Kowalik et al.
U.S. Appl. No. 11/342,374, filed Jan. 27, 2006, Kuechler et al.
U.S. Appl. No. 11/342,385, filed Jan. 27, 2006, Kuechler et al.
U.S. Appl. No. 11/342,386, filed Jan. 27, 2006, Kuechler et al.
N. Amin, et al., "Dealuminated ZSM-5 Zeolite Catalyst for Ethylene Oligomerization to Liquid Fuels", Journal of Natural Gas Chemistry, vol. 11, pp. 79-86, 2002. (Abstract).
S. Schwarz et al., "Effect of Silicon-to-Aluminium Ratio and Synthesis Time on High-Pressure Olefin Oligomerization over ZSM-5", Applied Catalysis, vol. 56, pp. 263-280, Dec. 15, 1989.
S. Inagaki, et al., "Influence of nano-particle agglomeration on the catalytic properties of MFI zeolite", Studies in Surface Science and Catalysis, vol. 135, pp. 566-572, 2001.
P. Yarlagadda, et al, "Oligomerization of Ethene and Propene over Composite Zeolite Catalysts", Applied Catalysis, vol. 62, pp. 125-139, Jun. 20, 1990.
M. Yamamura et al., "Synthesis of ZSM-5 zeolite with small crystal size and its catalytic performance for ethylene oligomerization", Zeolites, vol. 14, pp. 643-649, Nov.-Dec. 1994.

* cited by examiner

FEEDSTOCK PREPARATION OF OLEFINS FOR OLIGOMERIZATION TO PRODUCE FUELS

FIELD OF THE INVENTION

This invention relates to the preparation of hydrocarbon feedstock compositions useful for producing fuels, such as jet fuel and diesel fuel, and to methods of producing such compositions.

BACKGROUND OF THE INVENTION

Improved hydrocarbon compositions are needed to help meet the growing demand for middle distillate products, such as aviation turbine fuels, for example, JP-8, and diesel fuel. Diesel fuel generally provides a higher energy efficiency in compression ignition engines than automotive gasoline provides in spark combustion engines, and has a higher rate of demand growth than automotive gasoline, especially outside the U.S. Further, improved fuel compositions are needed to meet the stringent quality specifications for aviation fuel and the ever tightening quality specifications for diesel fuel as established by industry requirements and governmental regulations.

One known route for producing hydrocarbon compositions useful as fuels is the oligomerization of olefins over various molecular sieve catalysts. Exemplary patents relating to olefin oligomerization include U.S. Pat. Nos. 4,444,988; 4,456,781; 4,504,693; 4,547,612 and 4,879,428. In these disclosures, feedstock olefins are mixed with an olefinic recycle material and contacted with a zeolite, particularly in a series of fixed bed reactors. The oligomerized reaction product is then separated to provide a distillate stream, and typically a gasoline stream, and any number of olefinic recycle streams.

However, in these known oligomerization processes, the focus is on producing relatively heavy distillate products, and even lube base stocks. To enable the production of relatively heavy materials, the processes employ, either directly or indirectly, a relatively large amount of olefinic recycle (typically>2:1 w/w relative to feed), containing significant quantities of $C_{10}+$ material. The relatively large recycle rate provides control over the exotherm of the oligomerization reaction in the preferred fixed bed, adiabatic reactor system, while the relatively heavy recycle composition (in conjunction with high conversion of light olefin feed, in part enabled by a relatively low WHSV) enables the growth of heavier oligomers and thus higher molecular weight and denser distillate product. However, the high rate of recycle requires much larger equipment to handle the increased volumetric flow rate, and uses more separation/fractionation energy, and hence more and larger associated energy conservation elements. Further, the high molecular weight of the oligomer product requires very high temperatures for the fractionation tower bottoms streams that may eliminate the use of simple steam reboilers and require more expensive and complicated fired heaters.

The recycle streams in conventional olefin oligomerization processes are produced in a variety of fashions, typically including some sort of single stage flash drum providing a very crude separation of reactor product as a means of providing the relatively heavy components, followed by various fractionation schemes which may or may not provide sharper separations, and again often provide heavy components as recycle. The dense distillate product is generally characterized by a relatively high specific gravity (in excess of 0.775) and a high viscosity, in part due to the composition comprising relatively high levels of aromatics and naphthenes.

Very few references discuss both the merits and methods of producing lighter distillate products, typified by such as jet fuel, kerosene, and No. 1 Diesel, via the oligomerization of $C_3$ to $C_8$ olefins. Jet/kero is generally overlooked as a particularly useful middle distillate product, inasmuch as the volume consumed in the marketplace is considerably smaller than its heavier cousins, No. 2 Diesel and No. 4 Diesel (fuel oil). However, jet/kero is a high volume commercial product in its own right, and is also typically suitable as a particular light grade of diesel, called No. 1 Diesel, that is especially useful in colder climates given its tendency to remain liquid and sustain volatility at much lower temperatures. In addition, jet/kero type streams are often blended in with other stocks to produce No. 2 Diesel, both to modify the diesel fuel characteristics, and to allow introduction of otherwise less valuable blendstocks into the final higher value product.

U.S. Pat. No. 4,720,600 discloses an oligomerization process for converting lower olefins to distillate hydrocarbons, especially useful as high quality jet or diesel fuels, wherein an olefinic feedstock is reacted over a shape selective acid zeolite, such as ZSM-5, to oligomerize feedstock olefins and further convert recycled hydrocarbons. The reactor effluent is fractionated to recover a light-middle distillate range product stream and to obtain light and heavy hydrocarbon streams for recycle. The middle distillate product has a boiling range of about 165° C. to 290° C. and contains substantially linear $C_9$ to $C_{16}$ mono-olefinic hydrocarbons, whereas the major portion of the $C_6$ to $C_8$ hydrocarbon components are contained in the lower boiling recycle stream, and the major portion (e.g., 50 wt % to more than 90 wt %) of the $C_{16}^+$ hydrocarbon components are contained in the heavy recycle fraction.

U.S. Pat. No. 4,788,366 discloses a multi-stage process for upgrading an ethene-rich feed into heavier hydrocarbon products boiling in the lubricant, distillate and gasoline ranges. The process involves initially contacting the ethene-rich feed in a primary reaction stage with a fluidized bed of a zeolite catalyst, such as ZSM-5, and then separating the resultant effluent into at least a liquid stream containing a major amount of aromatics-rich $C_5+$ hydrocarbons and a gas stream rich in propene and butene. The gas stream is then fed to a secondary reaction stage comprising a series of fixed bed reactors containing a medium pore zeolite oligomerization catalyst, such as ZSM-5, ZSM-11, ZSM-12, ZSM-22, ZSM-23 or ZSM-35, preferably having a silica/alumina molar ratio of 20 to 200 and a crystal size of 0.2 to 1 micron. In the secondary reaction stage, at least part of the aromatics-rich, liquid primary stage effluent is mixed with a hot inter-stage stream containing partially upgraded olefins to quench said inter-stage stream and the resultant mixed stream is passed to at least one downstream oligomerization reactor. The conditions in the secondary reaction stage can be varied to control the product slate, but generally include a temperature of 235° C. to 315° C., a pressure of 2800 to 10,000 kPa and a weight hourly space velocity of 0.1 to 1.5. The product necessarily contains a significant quantity of aromatic hydrocarbons.

A similar process is described in U.S. Pat. No. 4,855,524, in which an olefin-containing light gas or light naphtha is oligomerized to a $C_{10}+$ aliphatic hydrocarbon product in multistage reaction zones. In particular, lower alkenes in the feed are oligomerized to intermediate range olefins, mainly in the $C_5$ to $C_9$ range, in a low severity primary reaction zone containing zeolite catalyst particles, preferably in the form of a fluidized bed. The primary reaction zone effluent is then separated into a $C_4-$ light gas stream and a predominantly olefinic $C_5+$ intermediate stream substantially free of $C_4-$ components. The intermediate stream is then contacted with a medium pore, shape selective, acid oligomerization catalyst in a secondary reaction zone under oligomerization conditions to produce a predominantly $C_{10}+$ product. To maximize the yield of distillate product, the '524 patent teaches that $C_{10}+$ hydrocarbons should be removed from said intermediate stream before passage through said secondary reaction zone and that said secondary reaction zone should be operated with catalyst having an average activity alpha greater than 10, at weight hourly space velocity (WHSV) in the range from about 0.1 to about 10 $hr^{-1}$, at an inlet pressure in excess of about 3200 kPa, an inlet temperature in the range from about 149° C. to about 232° C. and an outlet temperature in the range from about 232° C. to about 343° C. The overall yield and/or quality of the distillate may be further increased by recycling an insufficiently oligomerized portion of the product stream to the secondary reaction zone.

In accordance with the known olefin conversion and oligomerization processes, catalysts are specified that have certain characteristics conducive to their desired products, typically aromatics and heavier distillate products, even lube base stocks. Such characteristics of these known catalysts are not necessarily conducive to the production of lighter distillate products, for example, relatively large crystal size to constrain the larger molecules to enable oligomerization, and relatively high activity to increase the rate of reaction of the less reactive larger molecules. Further, such catalyst attributes in conjunction with the known process conditions favor the production of byproduct cyclics, e.g., aromatics, which are known to be detrimental to distillate and aviation fuel properties.

According to the present invention, it has now been found that by controlling the conditions of the oligomerization process and, in particular, the amount and composition of the recycle, $C_3$ to $C_8$ olefins can be converted into a novel hydrocarbon composition similar in make-up to that of conventional diesel and jet fuel, but with an unusually low specific gravity making it an excellent blending stock to produce fuel products, such as Jet Fuel A and No. 1 and No. 2 Diesel. In addition, the hydrocarbon composition of the invention is very low in sulfur, naphthenes, and aromatics, has a high cetane number and, in view of its low n-paraffin content, has a very low freezing point.

Feedstocks containing olefins suitable for use in the present invention may be obtained from a variety or sources and methods, for example, as a product or byproduct of a Fluid Catalytic Cracking Unit (typically termed in the art "FCCU") for the conversion of various petroleum streams to gasoline, or the pyrolysis at high temperatures of such petroleum streams in the presence of steam (generally termed in the art "Steam Cracking"), or as a byproduct of Fischer Tropsch units that convert a wide variety of refractory hydrocarbons to synthesis gas and subsequently to synthetic petroleum fractions (in one embodiment, termed "Gas To Liquids" or "GTL"). An emerging source of feedstock olefins for use in the present invention is an oxygenate to olefin conversion (generally termed in the art "OTO" or in a particular manifestation, Methanol To Olefins or "MTO").

One problem with olefin feedstocks from such sources is the presence of various non-olefin species that decrease the cycle life of the shape selective acid catalysts, e.g., zeolites, facilitating the oligomerization reaction in which they are used; that is, certain non-olefin species in the olefin feedstock decrease the time the catalyst can be on-stream in between regenerations. A particular non-olefin species of concern is dienes. For example, a problem with oxygenate conversion reactions for use in providing feedstock to oligomerization processes is that the olefin products often include significant quantities of $C_4+$ hydrocarbons comprising a significant proportion of dienes, particularly for MTO using SAPO catalysts. It has therefore been the conventional wisdom, e.g., as disclosed in International Publication No. WO06/33759, to drastically lower the diene levels by substantially converting all the highly unsaturated hydrocarbons, including dienes, to the corresponding olefins. However, such a drastic reduction in dienes generally requires either a second stage reactor operating at significantly less severe conditions, potentially with a different catalyst, or if done in a single stage, will be subject a very large amount of undesirable secondary reactions of the olefins to saturates.

There are other patents and publications relating to feedstocks prepared from oxygenate conversion processes. For instance, International Publication Nos. WO 05/17071 and WO 04/48299 disclose the preparation of feedstocks from oxygenate conversion reactions.

U.S. Pat. No. 4,544,792 discloses feedstock compositions with specified olefin contents and using hydrogen as a co-feed in an oligomerization reaction.

International Publication No. WO 04/09518 discloses a feedstock derived from an oxygenate conversion reaction for use in an oligomerization reaction, but does not specify the presence of dienes therein.

Other commonly-owned U.S. patent applications touching on this topic include, but may not be limited to, U.S. 2006-0199984A1; US 2006-0217580 A1; US 2006-0199987 A1; US 2006-0199985 A1; and US 2006-0199988 A1.

According to the present invention, it has now been found that drastically low levels of dienes in the feed are not required to prevent catalyst life reduction (degradation). Specifically, it has now been found that the impact on catalyst life is slight or undetectable when the feed contains a level of less than about 4000 wppm of total dienes. By being able to tolerate a higher level of dienes in the feed without significantly affecting catalyst life, a significant savings in capital and energy can be realized, allowing effective feedstock production in a single hydrogenation reactor at a single set of conditions. Being able to tolerate this level of dienes in the product of the hydrogenation step (and feed to the oligomerization step) also enables efficient production of the feed from the primary conversion step, such as MTO, steam cracking, or catalytic cracking. Through the present invention, a mixture of different olefins and diolefins may all be processed as a single feedstream, and hence produced by separation from the primary conversion step effluent in relatively few (e.g., one or two) separation steps. Generally, different diolefins require substantially different hydrogenation conditions to process effectively.

Patents and publications relating to hydrogenation of dienes include, for example, U.S. Pat. Nos. 6,646,176 and 6,469,223, which disclose selective diene hydrogenation using palladium and nickel catalysts, respectively.

Additionally, International Publication No. WO 05/23423 discloses selective dimerization of isobutene, and European Patent No. EP 0 742 195 further discloses etherification and metathesis.

Further, it has also now been found that having a number of different carbon number olefins in the feed to the oligomerization step can help to provide a distillate (ODG) product that has a wider distribution of carbon numbers and that is substantially closer in boiling characteristics to conventional petroleum-derived distillates. Thus, a synthetic distillate made according to the present invention can be advantageously used as a replacement for, or a blendstock with, those conventional distillate materials.

SUMMARY OF THE INVENTION

One aspect of the present invention relates to a method of making a hydrocarbon composition comprising:

a) providing a first feedstock containing olefins comprising at least 1.0 wt % butenes, at least 1.0 wt % pentenes, and at least 1.0 wt. % hexenes, and containing a first content of dienes that is greater than 4000 wppm, such that the dienes comprise at least 10 wppm of a $C_4$ diene and at least 10 wppm of a $C_5$ diene;

b) contacting the first feedstock with a hydrogenation catalyst in the presence of hydrogen to form a second feedstock containing a second content of dienes that is at least 100 wppm and less than the first content of dienes in the first feedstock;

c) contacting the second feedstock and an olefinic recycle stream with a molecular sieve catalyst in a reaction zone under conditions sufficient to oligomerize the olefins, and such that:

(i) the olefinic recycle stream and the second feedstock are present in a weight ratio of about 0.1 to about 3.0, (ii) the conditions in the reaction zone comprise a WHSV of at least 1.0, based on the olefins contained in the second feedstock, and (iii) the reaction zone exhibits a temperature range comprising a difference between a highest temperature and a lowest temperature, wherein the difference is 40° F. (22° C.) or less, thus producing an oligomerization effluent stream; and d) separating the oligomerization effluent stream into at least the olefinic recycle stream and a hydrocarbon product stream, such that the olefinic recycle stream contains no more than 10 wt % of $C_{10}+$ non-normal olefins, and such that the hydrocarbon product stream contains from 1 wt % to 30 wt % of $C_9$ non-normal olefins.

In an embodiment, the second content of dienes is less than 4000 wppm total dienes or no greater than 2500 wppm total dienes. In an embodiment, the olefins in the first feedstock comprise no greater than 70 wt % butenes. In an embodiment, the dienes in the first feedstock comprise no greater than 60 wt % $C_4$ dienes. In an embodiment, the olefins in the first feedstock comprise no greater than 50 wt % pentenes. In an embodiment, the dienes in the first feedstock comprise no greater than 60 wt % $C_5$ dienes. In an embodiment, the olefins in the first feedstock comprise no greater than 50 wt % hexenes. In an embodiment, the dienes in the first feedstock further comprise: (i) at least 10 wppm $C_6$ dienes, (ii) no greater than 60 wt % $C_6$ dienes, or (iii) both (i) and (ii). In an embodiment, the olefins in the first feedstock further comprise: (i) at least 1.0 wt % propylene, (ii) no greater than 50 wt % propylene, or (iii) both (i) and (ii). In an embodiment, the first feedstock further comprises: (i) at least 10 wppm methyl acetylene, (ii) at least 10 wppm propadiene, or (iii) at least 10 wppm of combined methyl acetylene and propadiene. In an embodiment, the olefins in the first feedstock further comprise: (i) at least 1.0 wt % $C_7$ dienes, (ii) at least 1.0 wt % $C_8$ dienes, or (iii) both (i) and (ii). In an embodiment, the dienes in the first feedstock further comprise one or more of the following: (i) at least 10 wppm $C_7$ dienes, (ii) at least 10 wppm $C_8$ dienes, (iii) at least 10 wppm of combined $C_7$ dienes and $C_8$ dienes, iv) no greater than 60 wt % $C_7$ dienes, (v) no greater than 60 wt % $C_8$ dienes, and (vi) no greater than 60 wt % of combined $C_7$ dienes and $C_8$ dienes. In an embodiment, the first feedstock comprises no greater than 10 wt % $C_{9+}$ hydrocarbons. In an embodiment, the first feedstock comprises no greater than 1.0 wt % $C_2$ hydrocarbons. In an embodiment, the first feedstock comprise less than 65 wt % saturates. In an embodiment, the first feedstock comprises less than 15 wt % saturates.

In an embodiment, the first feedstock is derived from an oxygenates-to-olefins process. In an embodiment, the first feedstock comprises oxygenates in an oxygenate content of: (i) at least 10 wppm; (ii) no greater than 2.0 wt %; or (iii) both (i) and (ii). In an embodiment, the oxygenates comprise at least one of dimethyl ether, methanol, acetone, and ethanal. In an embodiment, the combined amount of dimethyl ether, methanol, acetone, and ethanal comprises at least 50 wt % of the oxygenate content.

In an embodiment, the hydrogenation catalyst comprises a noble metal-containing catalyst. In an embodiment, the hydrogenation catalyst comprises a noble metal selected from the group consisting of nickel, palladium, platinum, and combinations thereof.

In an embodiment, the hydrogen and the first content of dienes in contacting step (b) are present in a molar proportion of hydrogen to diene species in the first feedstock of from about 1.0 to about 5.0.

In an embodiment, the contacting of the first feedstock with a hydrogenation catalyst in the presence of hydrogen occurs such that the olefins have a WHSV from about 1.0 to about 8.0, at a pressure from about 100 psig to about 500 psig, and/or at a temperature from about 100° F. (38° C.) to about 300° F. (149° C.).

In an embodiment, the contacting of the first feedstock with a hydrogenation catalyst in the presence of hydrogen occurs in a reaction zone across which a temperature difference exists of no greater than 50° F. (28° C.).

In an embodiment, the first feedstock has a first saturates content and the second feedstock has a second saturates content that is within 5 wt % of the first saturates content.

In an embodiment, the second feedstock has a hydrogen content no greater than 10 wppm.

In an embodiment, the molecular sieve catalyst comprises a 10-member pore ring structure or a 12-member pore ring structure. In an embodiment, the molecular sieve catalyst is selected from the group consisting of ZSM 5, ZSM 12, ZSM 22, ZSM 57, MCM 22, intergrowths thereof, and combinations thereof.

In an embodiment, the hydrocarbon product stream further comprises at least 40 wt % of components that boil at a temperature from about 365° F. (185° C.) to about 495° F. (257° C.). In an embodiment, the hydrocarbon product stream further comprises: (i) at least 92 wt % of $C_9$-$C_{20}$ non-normal olefins; (ii) at least 92 wt % of $C_9$-$C_{20}$ non-normal saturates; or (iii) both (i) and (ii). In an embodiment, the hydrocarbon product stream further comprises: (i) at least 60 wt % of $C_{11}$-$C_{18}$ non-normal olefins; (ii) at least 60 wt % of $C_{11}$-$C_{18}$ non-normal saturates; or (iii) both (i) and (ii). In an embodiment, the hydrocarbon product stream further comprises: (i) at least 50 wt % of $C_{12}$-$C_{16}$ non-normal olefins; (ii) at least 50 wt % of $C_{12}$-$C_{16}$ non-normal saturates; or (iii) both (i) and (ii).

In an embodiment, the hydrocarbon product stream further comprises a combination of compounds having the following carbon numbers and in the corresponding weight percentage ranges:

| | |
|---|---|
| C9 | 5-20; |
| C10 | 5-20; |
| C11 | 5-15; |
| C12 | 15-40; |
| C13 | 5-10; |

-continued

| | |
|---|---|
| C14 | 5-10; |
| C15 | 5-10; |
| C16 | 5-20; |
| C17 | 2-5; |
| C18 | 2-5; |
| C19 | 1-3; and |
| C20 | 1-3. |

In an embodiment, the method of making a hydrocarbon composition further comprises: (e) contacting the hydrocarbon product stream with a source of hydrogen to form a saturate product having an aliphatic hydrocarbon content of at least 80 wt %.

Another aspect of the invention relates to a synthetic hydrocarbon composition made according to the method of the invention. Advantageously, the synthetic hydrocarbon composition further comprises one or more of the following properties:

(a) at least 90 wt % is composed of $C_9$ to $C_{20}$ non-normal olefins, non-normal saturates, or combinations thereof, (b) at least 2 wt % and not greater than 25 wt % is composed of $C_9$ hydrocarbons;

(c) less than 15 wt % is composed of $C_{17}$+ hydrocarbons; and (d) a specific gravity at 15° C. of at least 0.730 and less than 0.775.

Another aspect of the invention relates to a jet fuel comprising the synthetic hydrocarbon composition made according to the method of the invention. Advantageously, the synthetic hydrocarbon composition can be present in a blend with a petroleum-derived distillate composition.

Another aspect of the invention relates to a diesel fuel comprising the synthetic hydrocarbon composition made according to the method of the invention. Advantageously, the synthetic hydrocarbon composition can be present in a blend with a petroleum-derived distillate composition.

DETAILED DESCRIPTION OF THE PREFERRED EMBODIMENTS

Figure 1:
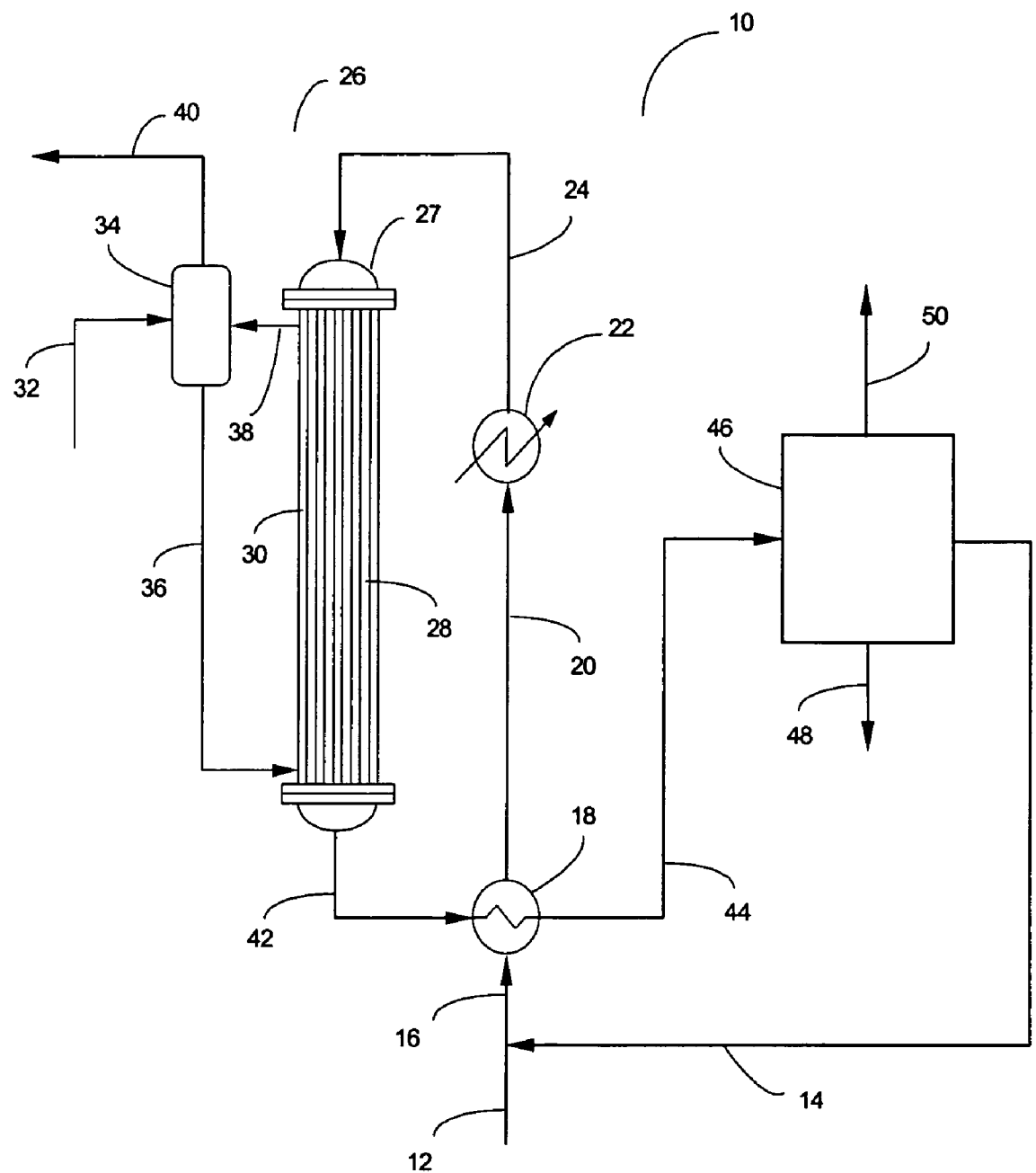
FIG. 1 is a flow diagram of a process for producing a hydrocarbon composition according to one example of the invention.

As used herein, the term "$C_x$ hydrocarbon" indicates hydrocarbon molecules having the number of carbon atoms represented by the subscript "x". The term "$C_x$+ hydrocarbons" indicates those molecules noted above having the number of carbon atoms represented by the subscript "x" or greater. For example, "$C_{17}$+ hydrocarbons" would include $C_{17}$, $C_{18}$, and higher carbon number hydrocarbons. Similarly "$C_x$– hydrocarbons" indicates those molecules noted above having the number of carbon atoms represented by the subscript "x" or fewer.

Distillation temperature values cited herein, including end point (or final boiling point), 90 vol % recovered temperature (T90) and 10 vol % recovered temperature (T10) refer to measurements made in accordance with ASTM Test Method D86, the entire contents of which test are incorporated herein by reference.

References herein to flash point temperatures refer to measurements made in accordance with ASTM Test Method D56, the entire contents of which test are incorporated herein by reference.

References herein to freezing point temperatures refer to measurements made in accordance with ASTM Test Method D2386, the entire contents of which test are incorporated herein by reference.

References herein to Jet Fuel Thermal Oxidation Test (JF-TOT) breakthrough results refer to measurements made in accordance with ASTM Test Method D4231, the entire contents of which test are incorporated herein by reference.

Kinematic viscosity values cited herein refer to measurements made in accordance with ASTM Test Method D445, the entire contents of which test are incorporated herein by reference.

References herein to the aromatics content of hydrocarbon compositions refer to measurements made in accordance with ASTM Test Method D1319, the entire contents of which test are incorporated herein by reference.

References herein to the sulfur content of hydrocarbon compositions refer to measurements made in accordance with ASTM Test Method D129, the entire contents of which test are incorporated herein by reference.

As used herein, the term "specific gravity" is to be understood as including the reference density of water at 4° C.; the temperature attached to the term herein is for that of the density of the material being described. For example, as used herein the phrase "hydrocarbon having a specific gravity at 15° C." is to be understood as the ratio of the density of the hydrocarbon at 15° C. to the density of water at 4° C.

The present invention provides a novel hydrocarbon composition, a method of producing the hydrocarbon composition by olefin oligomerization and fuel blends containing the hydrocarbon composition.

Hydrocarbon Composition

The novel hydrocarbon composition of the invention has at least the following properties:

(a) at least 90 wt % of the hydrocarbon composition is composed of $C_9$ to $C_{20}$ non-normal olefins, non-normal saturates or combinations thereof;

(b) at least 2 wt. % and not greater than 25 wt % of the hydrocarbon composition is composed of $C_9$ hydrocarbons;

(c) less than 15 wt % of the hydrocarbon composition is composed of $C_{17}$+ hydrocarbons; and (d) said hydrocarbon composition has a specific gravity at 15° C. of at least 0.730 and less than 0.775.

With regard to property (a), the hydrocarbon composition typically, comprises at least 92 wt %, such as at least 95 wt %, or even at least 97 wt % of $C_9$-$C_{20}$ non-normal olefins, non-normal saturates or combinations thereof based on the weight of the hydrocarbon composition. In one embodiment, the hydrocarbon composition comprises between about 60 wt % and about 90 wt % of $C_{11}$-$C_{18}$ non-normal olefins, non-normal saturates or combinations thereof based on the weight of the hydrocarbon composition. In another embodiment, the hydrocarbon composition comprises between about 50 wt % and about 75 wt % $C_{12}$-$C_{16}$ non-normal olefins, non-normal saturates or combinations thereof based on the weight of the hydrocarbon composition. This is particularly advantageous for the flexible use of the composition as an aviation or diesel fuel.

With regard to property (b), some or all of said $C_9$ hydrocarbons may be non-normal olefins, non-normal saturates or combinations thereof. Typically, the hydrocarbon composition comprises at least 3 wt %, such as at least 4 wt %, for example at least 5 wt %, or even at least 10 wt % of $C_9$ hydrocarbons based on the weight of the hydrocarbon composition, but generally comprises no greater than 20 wt %, such as no greater than 15 wt % of $C_9$ hydrocarbons based on the weight of the hydrocarbon composition.

With regard to property (c), some or all of the $C_{17}$+ hydrocarbons may be non-normal olefins, non-normal saturates or combinations thereof. Typically, the hydrocarbon composition comprises less than 12 wt %, such as less than 10 wt %, for example less than 8 wt %, even less than 5 wt % of $C_{17}$+ hydrocarbons based on the weight of the hydrocarbon composition. Although there is no lower limit on the amount of $C_{17}$+ hydrocarbons, in general the hydrocarbon composition comprises at least 1 wt %, such as at least 2 wt %, for example at least 3 wt %, even as high as 5 wt % or 10 wt % of $C_{17}$+ hydrocarbons based on the weight of the hydrocarbon composition.

Of the $C_{17}$+ hydrocarbons in the hydrocarbon composition of the invention, there should generally be no greater than 12 wt %, for example no greater than 10 wt %, such as no greater than 7 wt %, even not greater than 2 wt % of $C_{17}$-$C_{20}$ hydrocarbons based on the weight of the hydrocarbon composition. In addition, there should generally be no greater than 8 wt %, such as no greater than 5 wt %, for example no greater than 3 wt % of $C_{19}$-$C_{20}$ hydrocarbons based on the weight of the hydrocarbon composition. Moreover, there should generally be no greater than 3.0 wt %, for example no greater than 1.0 wt %, such as no greater than 0.5 wt %, even no greater than 0.2 wt % of $C_{21}$+ hydrocarbons based on the weight of the hydrocarbon composition.

With regard to property (d), the hydrocarbon composition of the invention generally has a specific gravity at 15° C. of at least 0.740, such as at least 0.750, and no greater than 0.770, such as no greater than 0.765.

In addition to the $C_9$+ components discussed above, the hydrocarbon composition of the invention can contain at least 0.1 wt %, such as at least 0.2 wt % of $C_8$– hydrocarbons based on the weight of the hydrocarbon composition. However, the composition should generally contain no greater than 5 wt %, such as no greater than 3 wt %, for example no greater than 1 wt % of $C_8$– hydrocarbons based on the weight of the hydrocarbon composition. Typically, the hydrocarbon composition contains less than 5 wt %, such as less than 2 wt %, for example less than 1 wt %, such as less than 0.5 wt %, for example less than 0.1 wt %, such as less than 0.05 wt %, for example less than 0.01 wt %, even less than 0.005 wt % aromatics.

Typically, the hydrocarbon composition of the invention has a flash point of at least 38° C., such as at least 40° C., for example at least 45° C., or at least 50° C. or even at least 55° C. It is, however, to be appreciated that it may be necessary to reduce the content of $C_9$ non-normal hydrocarbons in the composition to achieve these higher flash points. For, example, to achieve a flash point of at least 55° C., it may be necessary to reduce the content of $C_9$ non-normal hydrocarbons in the composition to no greater than about 10 wt %.

Conveniently, the hydrocarbon composition of the invention has a Jet Fuel Thermal Oxidation Test (JFTOT) breakpoint result of at least 260° C., more typically at least 270° C., such as at least 280° C., for example at least 290° C., such as at least 300° C., even at least 310° C.

Typically, the hydrocarbon composition of the invention meets all the specifications for a No. 1-D S5000 diesel fuel, and generally for a No. 1-D S500 diesel fuel, or even a No. 1-D S15 diesel fuel as set out in Table 1 of ASTM D975-04a, the entire contents of which standard are incorporated herein by reference. In the generic designation "SXXX" in ASTM D975-04a, XXX is the wppm of sulfur in the fuel. Thus, the present composition is exceedingly low in sulfur.

Typically, the hydrocarbon composition of the invention has a low electrical conductivity, such as no greater than 150 pS/m, such as no greater than 100 pS/m, for example no greater than 50 pS/m or even as low as 10 pS/m, according to ASTM Test Method D2624, the entire contents of which test are incorporated herein by reference. Whereas this is not necessarily an attractive attribute for a fuel, especially an aviation fuel, additives to increase electrical conductivity, for example, Stadis 450 (marketed by Octel America, 200 Executive Drive, Newark, N.J. 19702), can be combined with the present composition such that composition including the additive has an electrical conductivity of at least 50 pS/m, such as at least 100 pS/m, for example at least 150 pS/m, or at least 200 pS/m or even at least 250 pS/m, but no greater than 450 pS/m, again according to ASTM Test Method D2624.

The hydrocarbon composition of the invention may further include other additives, the types and proportions of which may be found in Table 2 of ASTM D1655-04, the entire contents of which standard are incorporated herein by reference.

Process of Producing the Hydrocarbon Composition

The hydrocarbon composition of the invention can be produced by oligomerizing a feed containing at least one $C_3$-$C_8$ olefin together with an olefinic recycle stream containing no more than 10 wt % $C_{10}$+ non-normal olefins over a molecular sieve catalyst such that the recycle to fresh feed weight ratio is from about 0.5 to about 2.0 and the difference between the highest and lowest temperatures within the reactor is about 40° F. (22° C.) or less. The oligomerization product is then separated into the hydrocarbon stream according to the invention and at least one light olefinic stream. At least part of the light olefinic stream(s) is then recycled to the oligomerization process.

The fresh feed to the oligomerization process can include any single $C_3$-$C_8$ olefin or any mixture thereof in any proportion. Particularly suitable feeds include mixtures of propylene and butylenes having at least 5 wt %, such as at least 10 wt %, for example at least 20 wt %, such as at least 30 wt % or at least 40 wt % $C_4$ olefin. Also useful are mixtures of $C_3$-$C_5$ olefins having at least 40 wt % $C_4$ olefin and at least 10 wt % $C_5$ olefin.

In one embodiment, the olefinic feed is obtained by the conversion of an oxygenate, such as methanol, to olefins over a either silicoaluminophosphate (SAPO) catalyst, according to the method of, for example, U.S. Pat. Nos. 4,677,243 and 6,673,978, or an aluminosilicate catalyst, according to the methods of, for example, International Publication Nos. WO 04/18089 and WO 04/16572, European Patent No. EP 0 882 692, and/or U.S. Pat. No. 4,025,575. Alternatively, the olefinic feed can be obtained by the catalytic cracking of relatively heavy petroleum fractions, or by the pyrolysis of various hydrocarbon streams, ranging from ethane to naphtha to heavy fuel oils, in admixture with steam, in a well understood process known as "steam cracking".

As stated above, the feed to the oligomerization process also contains an olefinic recycle stream containing no more than 10 wt % $C_{10}$+ non-normal olefins. Generally, the olefinic recycle stream should contain no greater than 7.0 wt %, for example no greater than 5.0 wt %, such as no greater than 2.0 wt %, or no greater than 1.0 wt % or even 0.1 wt % $C_{10}$+ olefin. Alternatively, the final boiling point temperature of the olefinic recycle stream should be no greater than 340° F. (170° C.), such as no greater than 320° F. (160° C.), for example no greater than 310° F. (155° C.), or even 305° F. (150° C.). In one embodiment, the olefinic recycle stream contains no greater than 30.0 wt %, such as no greater than 25.0 wt %, for example no greater than 20.0 wt %, or no greater than 15.0 wt %, or no greater than 10.0 wt % $C_9$+ olefin. Alternatively, the final boiling point temperature of the olefinic recycle stream should be no greater than 290° F. (140° C.), such as no greater than 275° F. (135° C.), for example no greater than 260° F. (130° C.).

In one embodiment, the olefinic recycle stream contains no greater than 30 wt %, or no greater than 25 wt %, or no greater than 20 wt %, or no greater than 10 wt %, or no greater than 5 wt % $C_4$ hydrocarbons (of any species). This can be achieved, for example, by employing an additional separation of all or a portion of the light olefinic stream into a stream comprising $C_4$− with only a small amount of $C_5$+ hydrocarbons, and using the remaining debutanized stream as the recycle stream.

The amount of olefinic recycle stream fed to the oligomerization process is such that the recycle to fresh feed weight ratio is from about 0.5 to about 2.0. More particularly, the mass ratio of olefinic recycle stream to fresh olefinic feedstock can be at least 0.7 or at least 0.9, but generally is no greater than 1.8, or no greater than 1.5, or no greater than 1.3.

In addition, the feedstock, the recycle or both may comprise other materials, such as an inert diluent, for example, a saturated hydrocarbon, or other hydrocarbon species, such as aromatics or dienes.

The catalyst used in the oligomerization process can include any crystalline molecular sieve which is active in olefin oligomerization reactions. In one embodiment, the catalyst includes a medium pore size molecular sieve having a Constraint Index of about 1 to about 12. Constraint Index and a method of its determination are described in U.S. Pat. No. 4,016,218, which is incorporated herein by reference. Examples of suitable medium pore size molecular sieves are those having 10-membered ring pore openings and include those of the TON framework type (for example, ZSM-22, ISI-1, Theta-1, Nu-10, and KZ-2), those of the MTT framework type (for example, ZSM-23 and KZ-1), of the MFI structure type (for example, ZSM-5), of the MFS framework type (for example, ZSM-57), of the MEL framework type (for example, ZSM-11), of the MTW framework type (for example, ZSM-12), of the EUO framework type (for example, EU-1) and members of the ferrierite family (for example, ZSM-35).

Other examples of suitable molecular sieves include those having 12-membered pore openings, such as ZSM-18, zeolite beta, faujasites, zeolite L, mordenites, as well as members of MCM-22 family of molecular sieves (including, for example, MCM-22, PSH-3, SSZ-25, ERB-1, ITQ-1, ITQ-2, MCM-36, MCM-49 and MCM-56).

In one embodiment, the crystalline aluminosilicate molecular sieve has an average ($d_{50}$) crystal size no greater than 0.15 micron, such as no greater than 0.12, 0.10, 0.07 or 0.05 micron, or such as about 0.01 to about 0.10 micron, about 0.02 to about 0.08 micron, or about 0.02 to about 0.05 micron. In addition, the molecular sieve is preferably selected so as to have an alpha value between about 100 and about 600, conveniently between about 200 and about 400, or between about 250 and about 350. The alpha value of a molecular sieve is an approximate indication of its catalytic cracking activity compared with a standard silica-alumina catalyst test (with an alpha value of 1). The alpha test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

Conveniently the crystalline aluminosilicate molecular sieve having a silica to alumina molar ratio of about 20 to about 300, such as about 20 to about 150, for example about 45 to about 90.

In one preferred embodiment, the molecular sieve catalyst comprises ZSM-5. Suitable methods to produce ZSM-5 useful in the present invention are exemplified in U.S. Pat. Nos. 3,926,782, 5,369,071 and 6,180,550, specifically directed to producing crystals with a crystal size less than 0.15 micron, and significantly less than 0.15 as desired. Methods are also known to control ZSM-5 crystal morphology, e.g., geometry and size homogeneity, such as disclosed in European Patent Application No. 0 093 519 and U.S. Pat. Nos. 4,526,879 and 5,063,187. These references also provide information on the control of silica to alumina ratio and alpha properties.

The molecular sieve may be supported or unsupported, for example in powder form, or used as an extrudate with an appropriate binder. Where a binder is employed, the binder is conveniently a metal oxide, such as alumina, and is present in an amount such that the oligomerization catalyst contains between about 2 wt % and about 80 wt % of the molecular sieve.

The oligomerization reaction should be conducted at sufficiently high WHSV of fresh feed to the reactor to ensure the desired low level of $C_{17}$+ oligomers in the reaction product. In general, the reaction should occur at a WHSV of no less than 1.5, or no less than 2, or no less than 2.2, or no less than 2.5, or no less than 2.8, or no less than 3.1, or no less than 3.8, or no less than 4.6, or no less than 5.4, or no less than 6.2 based on olefin in the fresh feed to the reactor and the amount of molecular sieve in the oligomerization catalyst. With regard to the combined fresh olefin feed and recycle to the reactor, the WHSV should be no less than 2.3, or no less than 2.8, or no less than 3.4, or no less than 3.8, or no less than 4.6, or no less than 5.5, again based on the amount of molecular sieve in the oligomerization catalyst. The upper level of WHSV is not narrowly defined but is generally not more than 9 or 8, based on olefin in the fresh feed to the reactor and the amount of molecular sieve in the oligomerization catalyst. Increasing the WHSV beyond these levels may significantly decrease the catalyst/reactor cycle length between regenerations, especially at higher levels of $C_4$ conversion. For the same reason, the WHSV for the combined fresh olefin feed and recycle to the reactor should no more than 14, 12, 11, or 9 based on the amount of molecular sieve in the oligomerization catalyst.

Except where specifically noted otherwise, the Weight Hourly Space Velocity (WHSV) values cited herein for oligomerization reactions are based on the amount of the molecular sieve contained in the olefin oligomerization catalysts without allowing for any binder or matrix that may also be present in the catalyst.

The oligomerization process can be conducted over a wide range of temperatures, although generally the temperature within the oligomerization reaction zone should be between about 150° C. and about 350° C., such as between about 180° C. and about 330° C., for example between about 210° C. and 310° C.

It is, however, important to ensure that the temperature across the reaction zone is maintained relatively constant so as to produce the desired level of $C_4$ olefin conversion at a given WHSV and point in the reaction cycle. Thus, as discussed above, the difference between the highest and lowest temperatures within the reactor should be maintained at 40° F. (22° C.) or less, such as 30° F. (17° C.) or less, for example 20° F. (11° C.) or less, conveniently 10° F. (6° C.) or less, or even 5° F. (3° C.) or less.

The oligomerization process can be conducted over a wide range of olefin partial pressures, although higher olefin partial pressures are preferred since low pressures tend to promote cyclization and cracking reactions, and are thermodynamically less favorable to the preferred oligomerization reaction. Typical olefin partial pressures of olefins in the combined olefinic feed and light olefinic/recycle stream as total charge to the reactor comprise at least 400 psig (2860 kPa), such as at least 500 psig (3550 kPa), for example at least 600 psig (4240 kPa), or at least 700 psig (4930 kPa), or at least 800 psig (5620 kPa), or even 900 psig (6310 kPa). It will, of course, be appreciated that the olefin partial pressure will be lower at the exit to the reactor as fewer moles of olefins exist due to the oligomerization reaction.

Typically, the conditions of the oligomerization process are controlled so as ensure that the conversion of $C_4$ olefins in the feed is at least 80 wt %, or at least 85 wt %, or at least 90 wt %, but no greater than 99 wt %, or no greater than 96 wt %, or no greater than 95 wt %, or no greater than 94 wt %. During the course of the oligomerization process, the catalyst will lose activity due to the accumulation of carbonaceous deposits and hence the $C_4$ olefin conversion will tend to decline with time. Thus to sustain a given level of $C_4$ olefin conversion, the temperature at which the oligomerization reaction is conducted is continually raised until some limit, discussed above, is reached. At that point, the catalyst is generally regenerated, either in situ or ex situ, by combustion of the coke deposits with oxygen/air using methods and conditions that are well known in the art. The regenerated catalyst may then be used again in the oligomerization reaction at some initial temperature, with the continually increasing temperature cycle being repeated.

Conveniently, the oligomerization process is conducted in a plurality of serial adiabatic reactors with interstage cooling, such as is disclosed in U.S. Pat. No. 4,560,536, the entire contents of which is incorporated herein by reference. In order to achieve the desired low ΔT within each reactor, more than three reactors, for example, about 4 to 10 reactors, may be required. Conveniently, the reactors employed are boiling water reactors, sometimes called heat exchanger reactors, e.g., such as is discussed in U.S. Pat. Nos. 4,263,141 and 4,369,255 (for methanol production), and in "Petroleum Processing, Principles and Applications," R. J. Hengstebeck, McGraw-Hill, 1959, pp. 208-218 (specifically for olefin oligomerization, using solid phosphoric acid).

The hydrocarbon composition produced by the oligomerization process described above can be blended, as described below to produce jet or diesel fuel, or can be saturated with hydrogen, e.g., according to the method of U.S. Pat. Nos. 4,211,640 and 6,548,721, the entire contents of which are incorporated herein by reference, to produce an aliphatic product. The saturated product can contain least 80 wt %, or at least 85 wt %, or at least 90 wt %, or at least 95 wt %, or at least 99 wt % aliphatic hydrocarbons. All other characteristics of the saturated distillate product in terms of carbon number distribution, non-normal proportions and boiling point ranges will remain largely unchanged from the olefinic product.

Referring now to FIG. 1, there is shown one example of an oligomerization process for producing a hydrocarbon composition according to the invention. The process shown in FIG. 1 employs an olefin oligomerization system 10, comprising a heat exchanger reactor system 26 and a separation device 46, among other elements. A fresh feedstock stream containing at least one $C_3$-$C_8$ olefin is provided in line 12, and an olefinic recycle stream containing no greater than 10 wt % $C_{10}$+ olefins is provided in line 14, such that the mass ratio of the flow of olefinic recycle in line 14 to the flow of feedstock in line 12 is at least 0.5 and no greater than 2.0. The combined materials are provided via line 16 to feed/effluent heat exchanger 18 to form a first heated combined reactor feed in line 20. The first heated combined reactor feed in line 20 is passed through a preheat exchanger 22 to form a second heated combined reactor feed in line 24. The unnumbered line through preheat exchanger 22 represents a heating medium, for example 900 psig (6310 kPa) steam, and the second heated combined reactor feed in line 24 should be at a greater temperature than the first heated combined reactor feed in line 20, but have a temperature no greater than the desired oligomerization reaction temperature in heat exchanger reactor 27.

The second heated combined reactor feed in line 24 is provided to heat exchanger reactor 27, where it flows through tubes 28, coming into contact with catalyst contained within the tubes 28. The rate of flow of the second heated combined reactor feed in line 24 and amount of catalyst within the tubes 28 of heat exchanger reactor 27 are such that a WHSV of at least 2.3 is achieved, based on the content of olefin in the second heated combined reactor feed in line 24 and the amount of molecular sieve in the catalyst.

The oligomerization reaction thus occurs within tubes 28, generating heat, which passes through tubes 28 to be absorbed by boiling water flowing around the outside of the tubes in shell side 30 of the reactor 27. The boiling water in shell side 30 is a mixture of steam and liquid water that passes through line 38 to disengaging vessel 34. Make-up liquid boiler feed water is provided in line 32 to disengaging vessel 34, and the combined liquid make-up boiler feed water and liquid water formed in the disengaging vessel 34 from the mixture of steam and liquid water that came through line 38 exit the bottom of disengaging vessel 34 through line 36. The steam generated in the heat exchanger reactor 27 emanates from the top of disengaging vessel 34 through line 40, and may be used, for example, to provide heat in fractionation tower reboilers or to make electricity in turbogenerators. The liquid water in line 36 is then provided to the shell side of heat exchanger reactor 27 to become the boiling water in shell side 30.

The presence of a relatively pure heat exchange component, such as water, in a boiling state on the shell side 30 provides an almost constant temperature within shell side 30 and can, given other appropriate design considerations of heat exchanger reactor 27, provide for a very close approach to isothermal conditions for the reaction occurring within the tubes 28. The difference between the highest and lowest temperature within and between all tubes 28 in heat exchanger reactor 27 is no greater than 40° F. (22° C.). Further, this configuration of heat exchanger reactor system 26 allows for good control of the reaction temperature within tubes 28 through controlling the pressure within the disengaging vessel 34 (sometimes called a "steam drum"). The pressure in the steam drum 34 controls the temperature at which the water will boil in shell side 30, one of the key factors governing the rate of absorption of the heat of reaction within tubes 28.

As the catalyst in tubes 28 deactivates with time on stream, a given level of conversion of olefins can be obtained by increasing the pressure in steam drum 34, thus increasing the boiling temperature of the fluid in shell side 30, and increasing the temperature of the oligomerization reaction within tubes 28. Of course, the temperature of the boiling fluid in shell side 30 must be kept lower than the desired oligomerization reaction temperature within tubes 28, conveniently at least 5° C. lower, such as at least 10° C. lower, including at least 15° C. lower and even at least 20° C. lower, but typically not exceeding 40° C. lower to reduce the risk of introducing too great a radial temperature gradient within tubes 28 and decreasing the isothermality of the oligomerization reaction within tubes 28.

One design consideration for approaching isothermal conditions in heat exchanger reactor 27 is a relatively small diameter for the tubes 28, for example, an outside diameter of less than about 3 inches (7.6 cm), conveniently less than about 2 inches (5.1 cm), such as less than about 1.5 inches (3.8 cm), and an inside diameter commensurate with the desired pressure rating for the inside of the tubes 28. This provides a relatively small resistance to heat transfer relative to the heat generated per unit volume of reaction space within tubes 28. Another such design consideration is a relatively long length for tubes 28, such as greater than about 5 meters, including greater than about 7 meters, conveniently greater than about 9 meters, which reduces the heat release per unit volume of reaction within tubes 28 and also promotes isothermality.

The oligomerization reaction product exits heat exchanger reactor 27 through line 42, and is provided to feed/effluent exchanger 18. The cooled reaction product exits feed/effluent exchanger 18 through line 44, and is provided to separation device 46. Separation device 46 may include one or more well known elements, such as fractionation columns, membranes, and flash drums, among other elements, and serves to separate the various components in the cooled reaction product in line 44 into various streams having differing concentrations of components than the cooled reaction product in line 44, including the desired hydrocarbon composition in line 48 and an olefinic recycle stream containing no greater than 10 wt. % C10 olefins in line 14. Additionally, one or more purge streams may be produced by separation device 46 and exit via line 50. Such purge streams in line 50 conveniently include streams richer in saturated hydrocarbons than the feedstock stream in line 12, such as a $C_4-$ rich stream containing unreacted butylenes and relatively concentrated $C_4-$ saturates, or a portion of material of identical or similar composition to that of the olefinic recycle in line 14 and relatively concentrated in $C_5+$ saturates. Providing such purge streams is convenient in controlling the partial pressure of olefins provided for reaction in heat exchanger reactor 27.

Fuel Blends

One preferred use of the hydrocarbon composition of the invention is in producing fuel blends, for example blends useful as jet fuels and diesel fuels.

In one embodiment of producing a fuel blend, the hydrocarbon composition of the invention is combined with a second hydrocarbon material having a specific gravity greater than 0.775 and/or having a having a freezing point of greater than −47° C. according to ASTM Test Method D2386. The blend meets all specifications for Jet Fuel A, or Jet Fuel A-1, as described in Table 1 of ASTM D1655-04. When used in such a blend, the hydrocarbon composition of the invention preferably has an end point (or final boiling point) of at least 270° C., or at least 290° C., or at least 300° C., or at least 310° C.

More particularly, the second hydrocarbon material used in making a blend useful as Jet Fuel A or Jet Fuel A-1 can have one or more of the following additional or alternative properties:

(i) a 10 vol % recovered temperature (T10) of at least 170° C., or at least 190° C., or at least 210° C., or at least 220° C.;

(ii) an end point (or final boiling point) of at least 220° C., or at least 240° C. or at least 260° C., and no greater than 270° C., or no greater than 290° C., or no greater than 300° C., or no greater than 320° C.;

(iii) a freezing point of greater than −40° C.;

(iv) a flash point of at least 40° C., or at least 50° C., or even at least 60° C.;

(v) an aromatics content of greater than 15 wt %, or greater than 25 wt %, or greater than 30 wt %, or greater than 40 wt %, or greater than 50 wt %; and (vi) a smoke point less than 30 mm, or less than 25 mm, or less than 20 mm, or less than 18 mm or less than 15 mm according to ASTM Test Method 1322, the entire contents of which are incorporated herein by reference.

The jet fuel blend can further include an additive to increase its electrical conductivity, for example, Stadis 450, as described above. The blend can also include other additives, the types and proportions of which may be found in Table 2 of ASTM D1655-04.

In another embodiment, the hydrocarbon composition of the invention is combined with a second hydrocarbon material having a specific gravity greater than 0.775 and less than 0.890 and/or having a kinematic viscosity at 40° C. greater than 1.9 (mm²/S). Depending on the sulfur content and/or viscosity of the hydrocarbon composition of the invention and the second hydrocarbon material, the resultant blend meets all specifications for No. 2-D S15, No. 2-D S500 or No. 2-D S5000 diesel fuel as described in Table 1 of ASTM D975-04a, Table 1. In particular, when the hydrocarbon composition of the invention has a sulfur content less than 15 wppm and the second hydrocarbon material has a sulfur content greater than 15 wppm, the blend meets all specifications for No. 2-D S15 diesel fuel as described in Table 1 of ASTM D975-04a. When the hydrocarbon composition of the invention has a sulfur content less than 500 wppm and the second hydrocarbon material has a sulfur content greater than 500 wppm, the blend meets all specifications for No. 2-D S500 diesel fuel as described in Table 1 of ASTM D975-04a. When the hydrocarbon composition of the invention has a kinematic viscosity at 40° C. less than 1.5 mm²/sec, or less than 2.0 mm²/sec, or less than 2.5 mm²/sec, and the second hydrocarbon material has a kinematic viscosity at 40° C. greater than 2.1 mm²/sec, or greater than 2.5 mm²/sec, or greater than 3.0 mm²/sec, or greater than 3.5 mm²/sec, or greater than 4.1 mm²/sec, the blend meets all specifications for a No. 2-D S5000 diesel fuel as described in Table 1 of ASTM D975-04a.

In yet another embodiment, the hydrocarbon composition of the invention has a kinematic viscosity at 40° C. less than 1.3 mm²/sec and is combined with a second hydrocarbon material having a kinematic viscosity at 40° C. greater than 1.3 mm²/sec. Depending on the sulfur content and/or viscosity of the hydrocarbon composition of the invention and the second hydrocarbon material, the resultant blend meets all specifications for No. 1-D S15, No. 1-D S500 or No. 1-D S5000 diesel fuel as described in Table 1 of ASTM D975-04a, Table 1. In particular, when the hydrocarbon composition of the invention has a sulfur content less than 15 wppm and the second hydrocarbon material has a sulfur content greater than 15 wppm, the blend meets all specifications for No. 1-D S15 diesel fuel as described in Table 1 of ASTM D975-04a. When the hydrocarbon composition of the invention has a sulfur content less than 500 wppm and the second hydrocarbon material has a sulfur content greater than 500 wppm, the blend meets all specifications for No. 1-D S500 diesel fuel as described in Table 1 of ASTM D975-04a. When the hydrocarbon composition of the invention has a kinematic viscosity at 40° C. less than 1.5 mm$^2$/sec, or less than 2.0 mm$^2$/sec, or less than 2.5 mm$^2$/sec and the second hydrocarbon material has a kinematic viscosity at 40° C. greater than 1.5 mm$^2$/sec, or greater than 2.0 mm$^2$/sec, or greater than 2.4 mm$^2$/sec, the blend meets all specifications for a No. 1-D S5000 diesel fuel as described in Table 1 of ASTM D975-04a.

With respect to second hydrocarbon material used in making blends having the properties of No. 1 or No. 2 Diesel fuel, it conveniently has the following additional properties:

(i) a 90 vol % recovered temperature ($T_{90}$) of at least 282° C., or at least 300° C., or at least 338° C., or at least 345° C.;

(ii) an aromatics content of greater than 25 wt %, or greater than 30 wt %, or greater than 35 wt %, or greater than 40 wt %, or greater than 45 wt %, or greater than 50 wt %; and (iii) a flash point of at least 55° C., or at least 60° C., or at least 70° C.

Diene Content and Oligomer Distribution in Product

Another aspect of the present invention relates to a method of making a hydrocarbon composition. This method can advantageously include, but is not necessarily limited to, the following steps:

a) providing a first feedstock containing olefins comprising at least 1.0 wt % butenes, at least 1.0 wt % pentenes, and at least 1.0 wt. % hexenes, and containing a first content of dienes that is greater than 4000 wppm, such that the dienes comprise at least 10 wppm of a $C_4$ diene and at least 10 wppm of a $C_5$ diene;

b) contacting the first feedstock with a hydrogenation catalyst (e.g., a noble metal-containing catalyst) in the presence of hydrogen to form a second feedstock containing olefins and containing a second content of dienes that is at least 100 wppm and less than the first content of dienes in the first feedstock (e.g., less than 4000 wppm total dienes);

c) contacting the second feedstock and an olefinic recycle stream with a molecular sieve catalyst in a reaction zone under conditions sufficient to oligomerize the olefins, and such that:

(i) the olefinic recycle stream and the second feedstock are present in a weight ratio of about 0.1 to about 3.0, (ii) the conditions in the reaction zone comprise a WHSV of at least 1.0 based on the olefins contained in the second feedstock, and (iii) the reaction zone exhibits a temperature range comprising a difference between a highest temperature and a lowest temperature, wherein the difference is 40° F. (22° C.) or less, thus producing an oligomerization effluent stream; and d) separating the oligomerization effluent stream into at least the olefinic recycle stream and a hydrocarbon product stream, such that the olefinic recycle stream contains no more than 10 wt % of $C_{10}$+ non-normal olefins, and such that the hydrocarbon product stream contains from 1 wt % to 30 wt % of $C_9$ non-normal olefins.

As used herein, "normal" olefins are defined as straight-chain linear (non-branched and non-cyclic) olefins. Non-limiting examples of normal olefins can include, 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 5-decene, and the like, and combinations thereof. Also as used herein, "non-normal" olefins are defined as any olefins not classified as "normal" olefins. For example, "non-normal" olefins can include, but are not limited to, branched olefins, cyclic olefins, branched cyclic olefins, and the like, and combinations thereof.

Without being bound by theory, it is believed that the composition of the first feedstock (e.g., containing at least 1.0 wt % butenes, at least 1.0 wt % pentenes, at least 1.0 wt % hexenes, at least 4000 wppm total dienes, at least 10 wppm of $C_4$ dienes, and at least 10 wppm of $C_5$ dienes) can be particularly advantageous for providing a hydrocarbon product stream with a more balanced carbon number distribution that is more typical of conventional distillate streams. This can be an advantage with respect to value, for example, if used as a blendstock with conventional distillate streams.

In an embodiment, the butene content in the first feedstock can alternately be at least 2.0 wt %, at least 5 wt %, at least 10 wt %, at least 25 wt %, at least 40 wt %, or at least 60 wt %, based on the entire weight of the first feedstock and/or based on the weight of only the olefins and diolefins within the first feedstock (e.g., normalizing out saturates, aromatics, and the like, which may also be present in the first feedstock). Additionally or alternately, the butene content in the first feedstock can be no greater than 90 wt %, no greater than 80 wt %, or no greater than 70 wt %, based on the entire weight of the first feedstock and/or based on the weight of only the olefins and diolefins within the first feedstock (e.g., normalizing out saturates, aromatics, and the like, which may also be present in the first feedstock).

In an embodiment, the $C_4$ diene content in the first feedstock can advantageously be at least 50 wppm, at least 100 wppm, at least 200 wppm, at least 500 wppm, or at least 1000 wppm, based on the entire weight of the first feedstock and/or based on the weight of only the olefins and diolefins within the first feedstock (e.g., normalizing out saturates, aromatics, and the like, which may also be present in the first feedstock). Additionally or alternately, the $C_4$ diene content in the first feedstock can be no greater than 60 wt %, no greater than 50 wt %, no greater than 40 wt %, no greater than 30 wt %, no greater than 20 wt %, no greater than 10 wt %, no greater than 5 wt %, or no greater than 3.0 wt %, based on the entire weight of the first feedstock and/or based on the weight of only the olefins and diolefins within the first feedstock (e.g., normalizing out saturates, aromatics, and the like, which may also be present in the first feedstock).

In an embodiment, the pentene content in the first feedstock can alternately be at least 2.0 wt %, at least 5 wt %, at least 10 wt %, at least 25 wt %, at least 40 wt %, or at least 60 wt %, based on the entire weight of the first feedstock and/or based on the weight of only the olefins and diolefins within the first feedstock (e.g., normalizing out saturates, aromatics, and the like, which may also be present in the first feedstock). Additionally or alternately, the pentene content in the first feedstock can be no greater than 90 wt %, no greater than 70 wt %, or no greater than 50 wt %, based on the entire weight of the first feedstock and/or based on the weight of only the olefins and diolefins within the first feedstock (e.g., normalizing out saturates, aromatics, and the like, which may also be present in the first feedstock).

In an embodiment, the $C_5$ diene content (any isomer) in the first feedstock can advantageously be at least 50 wppm, at least 100 wppm, at least 200 wppm, at least 500 wppm, or at least 1000 wppm, based on the entire weight of the first feedstock and/or based on the weight of only the olefins and diolefins within the first feedstock (e.g., normalizing out saturates, aromatics, and the like, which may also be present in the first feedstock). Additionally or alternatively, the $C_5$ diene content in the first feedstock can be no greater than 60 wt %, no greater than 50 wt %, no greater than 40 wt %, no greater than 30 wt %, no greater than 20 wt %, no greater than 10 wt %, no greater than 5 wt %, or no greater than 3.0 wt %, based on the entire weight of the first feedstock and/or based on the weight of only the olefins and diolefins within the first feedstock (e.g., normalizing out saturates, aromatics, and the like, which may also be present in the first feed stock).

In an embodiment, the hexene content in the first feedstock can alternately be at least 2.0 wt %, at least 5 wt %, at least 10 wt %, at least 25 wt %, at least 40 wt %, or at least 60 wt %, based on the entire weight of the first feedstock and/or based on the weight of only the olefins and diolefins within the first feedstock (e.g., normalizing out saturates, aromatics, and the like, which may also be present in the first feedstock). Additionally or alternatively, the hexene content in the first feedstock can be no greater than 90 wt %, no greater than 70 wt %, or no greater than 50 wt %, based on the entire weight of the first feedstock and/or based on the weight of only the olefins and diolefins within the first feedstock (e.g., normalizing out saturates, aromatics, and the like, which may also be present in the first feedstock).

In an embodiment, the first feedstock may further contain a $C_6$ diene (any isomer). In embodiments where $C_6$ diene is present, the $C_6$ diene content in the first feedstock can be at least 10 wppm, at least 50 wppm, at least 100 wppm, at least 200 wppm, at least 500 wppm, or at least 1000 wppm, based on the entire weight of the first feedstock and/or based on the weight of only the olefins and diolefins within the first feedstock (e.g., normalizing out saturates, aromatics, and the like, which may also be present in the first feedstock). Additionally or alternatively, the $C_6$ diene content in the first feedstock can be no greater than 60 wt %, no greater than 50 wt %, no greater than 40 wt %, no greater than 30 wt %, no greater than 20 wt %, no greater than 10 wt %, no greater than 5 wt %, no greater than 3 wt %, or no greater than 1.0 wt %, based on the entire weight of the first feedstock and/or based on the weight of only the olefins and diolefins within the first feedstock (e.g., normalizing out saturates, aromatics, and the like, which may also be present in the first feedstock).

In an embodiment, the first feedstock may further contain propylene ($C_3$ olefin). In embodiments where propylene is present in the first feedstock, an increase in pressure of the hydrogenation step may be necessary in order to maintain (e.g., to substantially maintain) the feedstock in the liquid phase. In embodiments where propylene is present in the first feedstock, the propylene content in the first feedstock can be at least 1.0 wt %, at least 2 wt %, at least 5 wt %, at least 10 wt %, at least 25 wt %, at least 40 wt %, or at least 60 wt %, based on the entire weight of the first feedstock and/or based on the weight of only the olefins and diolefins within the first feedstock (e.g., normalizing out saturates, aromatics, and the like, which may also be present in the first feedstock). Additionally or alternatively, the propylene content in the first feedstock can be no greater than 90 wt %, no greater than 70 wt %, or no greater than 50 wt %, based on the entire weight of the first feedstock and/or based on the weight of only the olefins and diolefins within the first feedstock (e.g., normalizing out saturates, aromatics, and the like, which may also be present in the first feedstock).

In an embodiment, the first feedstock may further contain methyl acetylene and/or propadiene, which may be a part of the stream from which propylene is obtained, if also present. In embodiments where methyl acetylene and/or propadiene are present in the first feedstock, the content of methyl acetylene may be at least 10 wppm, the content of propadiene at least 10 wppm, or the combined content of methyl acetylene and propadiene (collectively referred to as MAPD herein) at least 10 wppm, based on the entire weight of the first feedstock and/or based on the weight of only the olefins and diolefins within the first feedstock (e.g., normalizing out saturates, aromatics, and the like, which may also be present in the first feedstock). Additionally or alternatively, the MAPD content in the first feedstock can be at least 20 wppm, at least 50 wppm, at least 100 wppm, at least 500 wppm, or at least 1000 wppm, based on the entire weight of the first feedstock and/or based on the weight of only the olefins and diolefins within the first feedstock (e.g., normalizing out saturates, aromatics, and the like, which may also be present in the first feedstock).

In an embodiment, the first feedstock may further contain $C_7$ olefins (any isomer). In embodiments where $C_7$ olefins are present in the first feedstock, the $C_7$ olefin content in the first feedstock can be at least 1.0 wt %, at least 2 wt %, at least 5 wt %, at least 10 wt %, at least 25 wt %, or at least 40 wt %, based on the entire weight of the first feedstock and/or based on the weight of only the olefins and diolefins within the first feedstock (e.g., normalizing out saturates, aromatics, and the like, which may also be present in the first feedstock).

In an embodiment, the first feedstock may further contain $C_8$ olefins (any isomer). In embodiments where $C_8$ olefins are present in the first feedstock, the $C_8$ olefin content in the first feedstock can be at least 1.0 wt %, at least 2 wt %, at least 5 wt %, at least 10 wt %, at least 25 wt %, or at least 40 wt %, based on the entire weight of the first feedstock and/or based on the weight of only the olefins and diolefins within the first feedstock (e.g., normalizing out saturates, aromatics, and the like, which may also be present in the first feedstock).

In an embodiment, the first feedstock may further contain $C_7$ and/or $C_8$ dienes (any isomer). In embodiments where $C_7$ and/or $C_8$ dienes are present, the $C_7$ diene content, the $C_8$ diene content, and/or the combined $C_7$ and $C_8$ diene content, in the first feedstock can be at least 10 wppm, at least 50 wppm, at least 100 wppm, at least 200 wppm, at least 500 wppm, or at least 1000 wppm, based on the entire weight of the first feedstock and/or based on the weight of only the olefins and diolefins within the first feedstock (e.g., normalizing out saturates, aromatics, and the like, which may also be present in the first feedstock). Additionally or alternatively, the $C_7$ diene content, the $C_8$ diene content, and/or the combined $C_7$ and $C_8$ diene content, in the first feedstock can be no greater than 60 wt %, no greater than 50 wt %, no greater than 40 wt %, no greater than 30 wt %, no greater than 20 wt %, no greater than 10 wt %, no greater than 5 wt %, no greater than 3 wt %, or no greater than 1.0 wt %, based on the entire weight of the first feedstock and/or based on the weight of only the olefins and diolefins within the first feedstock (e.g., normalizing out saturates, aromatics, and the like, which may also be present in the first feedstock).

In some embodiments, it is preferred that the first feedstock have a relatively low proportion of $C_{9+}$ hydrocarbons, of any kind. For instance, in an embodiment, the first feedstock comprises no greater than 10 wt %, no greater than 5 wt %, or no greater than 1.0 wt %, based on the entire weight of the first feedstock. As noted above, it has been discovered that relatively high contents of $C_{9+}$ hydrocarbons in the distillate product can be particularly useful, and so an increased efficiency can be attained by not processing these hydrocarbons through the reactor and separation system according to the aforementioned process(es).

In some embodiments, it is preferred that the first feedstock have a relatively low amount of $C_{2-}$ hydrocarbons, of any kind (e.g., ethylene, ethane, methane). For instance, in an embodiment, the first feedstock comprises no greater than 1.0 wt %, or no greater than 0.1 wt %, based on the entire weight of the first feedstock. Ethylene is typically not conducive to maintaining a liquid phase hydrogenation system, such as preferred in the instant process(es). Further, ethylene is generally not nearly as reactive in the oligomerization system as other light olefins, and thus often requires substantially more processing in order to obtain a good ultimate conversion in the distillate product. Additionally, ethylene and light aliphatics (such as ethane and methane) are highly volatile, and typically require much more effort to recover in an oligomerization separation system, for example, necessitating the use of expensive and complicated refrigeration systems or the like.

In some embodiments, it is preferred that the first feedstock have a relatively low amount of saturated hydrocarbons (saturates), as they can tend to increase the amount of light olefin byproduct in the distillate (e.g., which would typically be withdrawn from the system in order to achieve the desired partial pressure of olefins in the total reactor charge), and thus can tend to decrease the ultimate yield of desired distillate product. In other words, the saturates in the feed typically wind up in the recycle, and can often reduce the amount of light olefinic stream that can be recycled to the reactor for eventual conversion to distillate product. In various embodiments, the amount of non-olefins, particularly saturates such as aliphatic hydrocarbons, present in the first feedstock can be less than 75 wt %, less than 65 wt %, less than 55 wt %, less than 45 wt %, less than 35 wt %, less than 25 wt %, less than 15 wt %, less than 10 wt %, or less than 5.0 wt %, based on the entire weight of the first feedstock.

The first feedstock can be obtained via any of a variety of processes, both conventional and unconventional. For instance, the first feedstock may be obtained through the conversion of oxygenates, such as methanol, to olefins over a SAPO catalyst, e.g., according to the methods of U.S. Pat. Nos. 4,677,243 and/or 6,673,978, the disclosures of each of which are fully incorporated herein by reference. Oxygenates-to-olefins (OTO) processes, e.g., methanol-to-olefins (MTO) processes, of this type can be particularly desirable as sources of the first feedstock, as such processes typically provide a first feedstock with a relatively low content (e.g., about 7 wt % or less) of saturates.

Additionally or alternatively, the first feedstock may be obtained via the pyrolysis of various hydrocarbon streams, ranging from ethane to naphtha to heavy fuel oils, e.g., in admixture with steam, in a process known to those of skill in the art as "steam cracking." The use of steam cracking processes can generally provide a first feedstock with a moderate content (e.g., about 7-12 wt %) of saturates.

Additionally or alternatively, the first feedstock may be obtained through the conversion of oxygenates, such as methanol, to olefins over an aluminosilicate (zeolite) catalyst, e.g., according to the methods of U.S. Pat. No. 4,025,575, International Publication Nos. WO 04/18089 and/or WO 04/16572, and/or European Patent No. EP 0 882 692. Oxygenates-to-olefins (OTO) processes, e.g., methanol-to-olefins (MTO) processes, of this type can be particularly desirable as sources of the first feedstock, as such processes typically provide a first feedstock with a relatively low content (e.g., about 8-15 wt %) of saturates.

Additionally or alternatively, the first feedstock may be obtained from the catalytic cracking of relatively heavy petroleum fractions, which can be called "Catalytic Cracking," "Cat Cracking," or "Fluid Catalytic Cracking" (FCC). The use of these catalytic cracking processes can generally provide a first feedstock with a relatively high content (e.g., about 30-60 wt %) of saturates.

Particularly in embodiments where the first feedstock is derived from an oxygenate conversion process, the first feedstock can further comprise an oxygenate content of at least 10 wppm, at least 100 wppm, at least 1000 wppm, at least 1400 wppm, at least 2000 wppm, or at least 3000 wppm, based on the entire weight of the first feedstock and/or based on the weight of only the olefins and diolefins within the first feedstock (e.g., normalizing out saturates, aromatics, and the like, which may also be present in the first feedstock). Additionally or alternatively, the oxygenate content in the first feedstock can be no greater than 2.0 wt %, no greater than 1.0 wt %, or no greater than 5000 wppm, based on the entire weight of the first feedstock and/or based on the weight of only the olefins and diolefins within the first feedstock (e.g., normalizing out saturates, aromatics, and the like, which may also be present in the first feedstock). In one embodiment, the oxygenate content in the first feedstock can comprise one or more of the following four oxygenates: dimethyl ether (DME), methanol, acetone, and ethanal. In some embodiments, at least 10 wt %, at least 20 wt %, or at least 50 wt % of the total oxygenate content in the first feedstock can be comprised of one of more of those four oxygenates.

Particularly in embodiments where the first feedstock is derived from an oxygenate conversion process, from a steam cracking process, from a catalytic cracking process, or from a combination thereof, the first feedstock stream may be obtained as a single stream from the separation of a primary conversion reaction effluent. For instance, the effluent, e.g., from a catalytic cracker may undergo two fractionation steps—a first to remove propylene and lower molecular weight components, and a second to remove some $C_6$ and higher molecular weight components. In this case, a single intermediate stream, meeting the requirement of $C_4$, $C_5$, and some $C_6$ olefin/diolefin content, can be provided to the reactor for conversion of dienes.

In a preferred embodiment, the first feedstock can be obtained as a single stream, or as a combination of no more than two streams, from at least two separation steps (e.g., via one or more fractionation towers). In such embodiments, the first feedstock can typically comprise at least 60 wt %, at least 70 wt %, at least 80 wt %, at least 90 wt %, or at least 95 wt % of the total amount of $C_4$, $C_5$, and $C_6$ molecules present in the primary conversion reaction effluent. Additionally or alternately, the first feedstock can preferably be a bottoms product of a fractionation tower, or a mixture of two such bottoms products.

In an embodiment, the hydrogenation catalyst employed in the diene conversion reaction comprises a noble metal. In embodiments where the hydrogenation catalyst comprises a noble metal, the noble metal can include, but is not limited to, nickel, palladium, platinum, or a combination thereof, preferably including palladium.

In an embodiment, the hydrogenation catalyst can generally comprise a noble metal placed on a support structure, such as silica or alumina. In embodiments where the hydrogenation catalyst comprises a supported noble metal, the amount of noble metal in the catalyst can be from 0.01 wt % to 5.0 wt %, from 0.1 wt % to 2.0 wt %, or from 0.2 wt % to 0.4 wt %, with respect to the combined amount of noble metal and support material.

In an embodiment, the WHSV, based on the entire catalyst, of the conversion reaction of dienes across the catalyst in the presence of hydrogen can be from about 1.0 to about 8.0, from about 2.0 to about 7.0, or from about 3.0 to about 6.0. Additionally or alternately, the WHSV, based on the combined first feedstock and hydrogen, and the entire catalyst (noble metal plus support), can be from about 1.0 to about 10.0, from about 2.0 to about 8.0, or from about 3.0 to about 6.0.

In an embodiment, the linear velocity of the combined first feedstock and hydrogen through the reactor can be from 1 cm/s to 10 cm/s, from 2 cm/s to 8 cm/s, or from 4 cm/s to 7 cm/s.

In an embodiment, the proportion of the moles of hydrogen relative to the total moles of individual diene species in the first feedstock contacted with the hydrogenation catalyst can be from about 1.0 to about 5.0, from about 1.1 to about 3.0, from about 1.2 to about 2.0, from about 1.3 to about 1.8, or from about 1.0 to about 1.6.

In an embodiment, the conditions of the conversion reaction of dienes across the catalyst in the presence of hydrogen can advantageously be selected such that at least 50 wt %, at least 60 wt %, at least 70 wt %, or at least 80 wt % of the combined first feedstock and hydrogen stream is in the liquid phase at the entrance conditions of the reactor.

In an embodiment, the pressure of the conversion reaction of dienes across the catalyst in the presence of hydrogen can be from about 100 psig to about 500 psig, from about 150 psig to about 450 psig, or from about 200 psig to about 400 psig.

In an embodiment, the temperature of the conversion reaction of dienes across the catalyst in the presence of hydrogen can be from about 100° F. (38° C.) to about 300° F. (149° C.), from about 125° F. (52° C.) to about 225° F. (107° C.), or from about 140° F. (60° C.) to about 200° F. (93° C.). Additionally or alternately, the temperature rise across the reaction zone may be no greater than about 50° F. (28° C.), no greater than about 40° F. (22° C.), or no greater than about 30° F. (17° C.). This temperature difference across the reaction zone can be achieved, e.g., by cooling the reactor via an external cooling means, such as by employing a heat exchanger reactor with catalyst in the tubes and cooling water flowing in the shell. Alternatively, the temperature difference across the reaction zone can be achieved by mass flow inertia, such as by employing an adiabatic reactor and cooling and recycling the reactor product to the reactor feed with the first feedstock and hydrogen. In embodiments where a product cooling and recycling means is used for the diene conversion reaction, the conditions and/or parameters described above will typically then pertain to the total reactor feed, including product recycle.

In an embodiment, the second feedstock, in addition to $C_4$ and $C_5$ dienes, may further contain $C_6$ dienes, such that total combined content of $C_4$, $C_5$, and $C_6$ dienes can be from about 100 wppm to less than the total combined content of $C_4$, $C_5$, and $C_6$ dienes in the first feedstock, or from about 100 wppm to about 4000 wppm. Additionally or alternately, the second feedstock can contain a total diene content from about 200 wppm to about 3500 wppm, from about 200 wppm to about 2000 wppm, from about 200 wppm to about 1000 wppm, from about 400 wppm to about 2000 wppm, from about 400 to about 1500 wppm, or from about 600 to about 1500 wppm.

In embodiments where one or more oxygenates are present in the first feedstock, the oxygenate(s) may proceed through the diene conversion reactor substantially unconverted. For instance, in an embodiment, the oxygenate content in the second feedstock can advantageously be within about 500 wppm, within about 100 wppm, within about 50 wppm, or within about 10 wppm, of the oxygenate content in the first feedstock.

In preferred embodiments, the diene conversion reaction should be relatively selective, in that the reaction preferably should not produce many more saturated dienes and/or olefins as a result of undesirable (side) reactions. Indeed, it is preferred that the total saturates content in the second feedstock be within 5 wt %, within 4 wt %, within 3 wt %, within 2 wt %, or within 1.0 wt % of the total saturates content in the first feedstock.

The diene conversion reactor product from which the second feedstock is derived can, in some embodiments, be a mixture of vapor and liquid, where the vapor is typically produced by the volatility of hydrogen and by the volatility it imposes (e.g., causing some of the higher molecular weight components to flash) on the reactor product. In embodiments where at least a portion of the reactor product is in the vapor phase, the proportion of reactor product in the vapor phase to product in the liquid phase will generally depend upon the product conditions and/or upon the amount of hydrogen in the reactor product, the latter of which typically being influenced by the reactor conditions and/or by the proportion of hydrogen provided along with the first feedstock (e.g., more hydrogen provided with the first feedstock generally results in more hydrogen in the reactor product). In preferred embodiments, the second feedstock comprises the liquid phase of the reactor product.

Additionally or alternately, the second feedstock may be obtained by a flash of the reactor product to provide a liquid (which would comprise at least a portion of the second feedstock) and to provide a light purge comprising hydrogen as a vapor. In such embodiments, the flash operation may be conducted, for example, at temperatures and pressures relatively close to those used in forming the reactor product, e.g., conveniently, only a few psig and degrees lower.

In many embodiments, it is preferred to have substantially no hydrogen (as $H_2$) added to the olefin oligomerization reaction zone, and thus to have little or no hydrogen present in the oligomerization product. U.S. Pat. Nos. 4,544,792 and 4,879,428 teach that hydrogen addition has significant benefits to catalyst cycle life in oligomerization reactions. However, in preferred embodiments of the present invention, hydrogen gas can cause difficulties in the separation step, particularly when using a fractionation tower for separating the oligomerization product, e.g., because $H_2$ gas can sharply reduce the bubble point temperature of the light olefinic (overhead product) stream. Further, in many embodiments of the present invention, catalyst cycle life is typically longer without the use of hydrogen than that demonstrated, for example, in U.S. Pat. No. 4,544,792.

Similarly, in many embodiments, it is preferred to have as little hydrogen as practical in the second feedstock, for example, substantially no more than may be dissolved in the feedstock from a flash operation following contact with the hydrogenation (e.g., noble metal) catalyst in the presence of hydrogen, as discussed above. In certain embodiments, the hydrogen content in the second feedstock can be no greater than 10 wppm, no greater than 5 wppm, or no greater than 1 wppm. Additionally or alternately, the hydrogen content in the second feedstock can be at least 0.1 wppm or at least about 0.5 wppm. Additionally or alternately, the parameters for hydrogen in the second feedstock, in the oligomerization reaction, or in both, can follow, for example, the disclosure of U.S. 2006-0199987 A1, which is fully incorporated by reference herein.

In an embodiment, the oligomerization reaction catalyst can advantageously include, but is not limited to, zeolitic and non-zeolitic molecular sieves, particularly those having 8- or higher member pore ring structures, preferably those having 10- or higher member pore ring structures, more preferably those having 10- and/or 12-member pore ring structures. Without being bound by theory, it is believe that smaller ring structure materials would not catalytically function as well in the oligomerization reaction, since they would not typically support the larger oligomer products, would likely coke/foul, and would likely lose activity more quickly. Additionally or alternately, the oligomerization reaction catalyst can advantageously include, but is not limited to, aluminosilicates, silicoaluminophosphates, aluminophosphates, and the like, and intergrowths thereof, and mixtures thereof. For instance, in one embodiment, the oligomerization reaction catalyst can include, but is not limited to, ZSM-5, ZSM-12, ZSM-22, ZSM-57, MCM-22, intergrowths thereof, and combinations thereof. In a preferred embodiment, the oligomerization reaction catalyst can advantageously include aluminosilicate ZSM-5, particularly when the ZSM-5 has a homogeneous crystal size of less than about 0.05 micron and a relatively high activity (alumina content), as characterized by a $SiO_2Al_2O_3$ content of about 50:1.

Additionally or alternately, the parameters of the oligomerization reaction catalyst, the oligomerization reaction conditions, and/or the olefinic recycle stream can follow, for example, the disclosure of US 2006-0217580 A1, which is fully incorporated by reference herein.

Additionally or alternately, the parameters of the reactor in which the oligomerization reaction is conducted and/or the separation of the oligomerization product can follow, for example, the disclosure herein and/or the disclosure of U.S. 2006-0199988 A1, which is fully incorporated by reference herein.

In an embodiment, the hydrocarbon product stream can contain at least 40 wt %, at least 50 wt %, at least 60 wt %, or at least 70 wt % of components that boil at a temperature from about 365° F. to about 495° F. (from about 185° C. to about 257° C.).

In an embodiment, the hydrocarbon product stream can contain at least 92 wt %, at least 95 wt %, or at least 97 wt % of $C_9$-$C_{20}$ non-normal olefins, of $C_9$-$C_{20}$ non-normal saturates, or of a combination thereof. Additionally or alternately, the hydrocarbon product stream can contain at least 60 wt %, and preferably no greater than 90 wt %, of $C_{11}$-$C_{18}$ non-normal olefins, of $C_{11}$-$C_{18}$ non-normal saturates, or of a combination thereof. Additionally or alternately, the hydrocarbon product stream can contain at least 50 wt %, and preferably no greater than 75 wt %, of $C_{12}$-$C_{16}$ non-normal olefins, of $C_{12}$-$C_{16}$ non-normal saturates, or of a combination thereof. The hydrocarbon product(s) of these embodiments is(are) particularly advantageous for the flexible use of the stream as an aviation fuel and/or a diesel fuel.

In an embodiment, the hydrocarbon product stream can contain a combination of compounds having the following carbon numbers and in the corresponding weight percentage ranges:

| | |
|---|---|
| $C_9$ | 5-20; |
| $C_{10}$ | 5-20; |
| $C_{11}$ | 5-15; |
| $C_{12}$ | 15-40; |
| $C_{13}$ | 5-10; |
| $C_{14}$ | 5-10; |
| $C_{15}$ | 5-10; |
| $C_{16}$ | 5-20; |
| $C_{17}$ | 2-5; |
| $C_{18}$ | 2-5; |
| $C_{19}$ | 1-3; and |
| $C_{20}$ | 1-3. |

Additionally or alternately, the parameters of the hydrocarbon product stream can follow, for example, the disclosure of U.S. 2006-0199985 A1, which is fully incorporated by reference herein.

In some embodiments where further processing of the hydrocarbon product stream is desired, the olefinic distillate product can be saturated with hydrogen, e.g., according to the method of U.S. Pat. Nos. 4,211,640 and/or 6,548,721, in order to produce a saturate (an aliphatic) product. In these embodiments, the saturated distillate product can have an aliphatic hydrocarbon content of at least 80 wt %, at least 85 wt %, at least 90 wt %, at least 95 wt %, or at least 99 wt %, based on the total weight of the distillate product. In a preferred embodiment, all characteristics of the saturated distillate product other than saturate content (e.g., carbon number distribution, proportions of non-normal olefins, boiling point ranges, and the like) can typically remain substantially unchanged from the olefinic distillate product. Additionally or alternately, the further processing of the hydrocarbon product stream, where desired, can follow, for example, the disclosure herein and/or the disclosure of U.S. 2006-0199988 A1, which is fully incorporated by reference herein.

Figure 2:
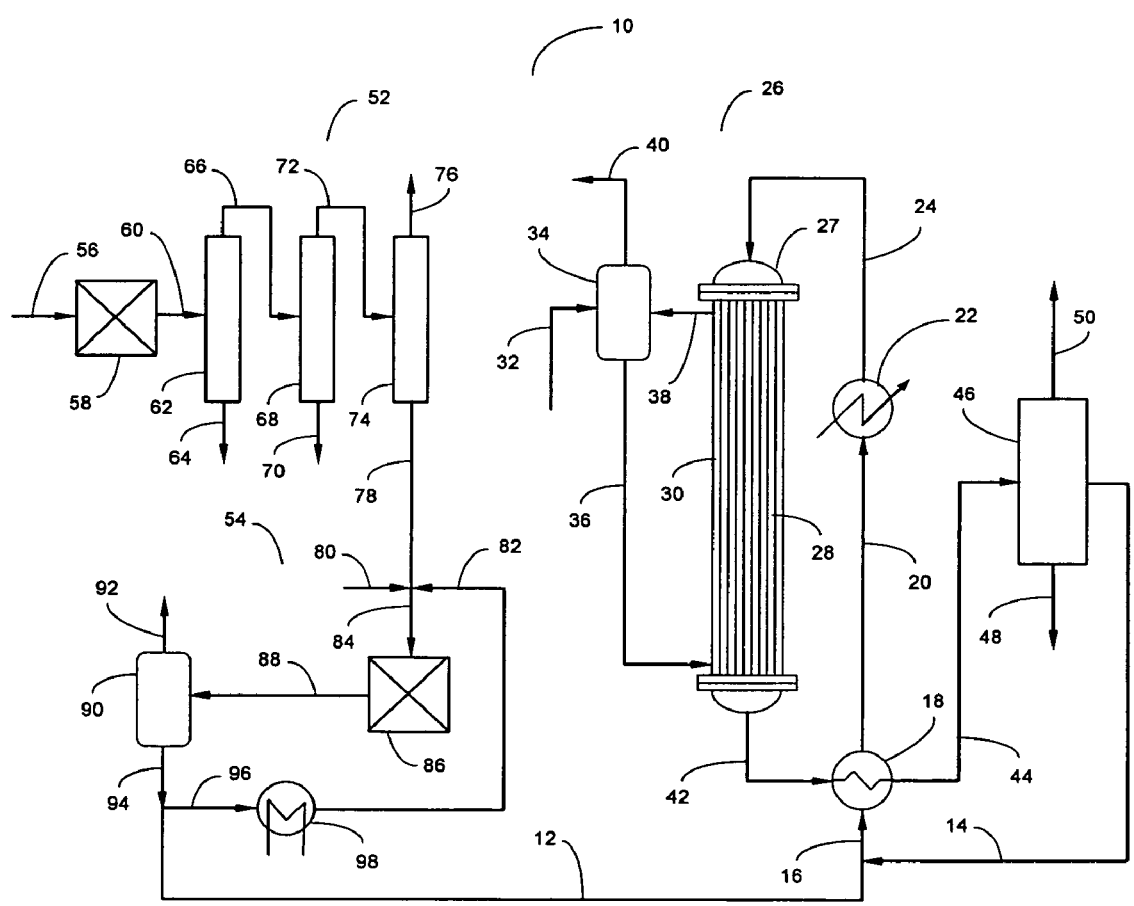
FIG. 2 is another flow diagram of a process for producing a hydrocarbon composition according to one example of the invention.

FIG. 2 diagrammatically represents one embodiment of an olefin oligomerization system 10, comprising olefin generation unit 52, mixed diene hydrogenation unit 54, heat exchanger reactor system 26, and separation device 46, among other elements.

A hydrocarbon containing feed in line 56 is provided to hydrocarbon conversion element 58 to convert the hydrocarbon containing feed to a material rich in olefins, including $C_3$-$C_8$ olefins, as an effluent in line 60. The hydrocarbon conversion element and hydrocarbon containing feed may be, for example, the catalytic conversion of methanol, the pyrolysis of naphtha or gas oil (steam cracking), or the catalytic conversion of gas oil (Fluid Catalyst Cracking Unit, or FCCU).

The olefin bearing effluent in line 60 is generally subjected to a set of separation steps, which may include, for example, cooling and water decantation, absorption fractionation, fractional distillation, membranes, etc. In this embodiment, a series of separation steps is shown as elements 62, 68, and 74. Taking the example of a methanol-to-olefins facility, element 62 may be a quench tower, with the decanted water flowing out in line 64, and an olefin bearing charge gas flowing out line 66 into a series of compressors and flash drum in element 68. Continuing within a methanol to olefins example, an aromatic and oxygenate laden stream would flow through line 70, with the balance of the pressurized olefin bearing charge gas leaving through line 72 to a fractional distillation tower 74, operated such that a stream rich in light olefins, such as ethylene and propylene, can exit via line 76, and a first feedstock stream containing at least 1.0 wt % butenes, at least 1.0 wt % pentenes, at least 1.0 wt. % hexenes, and at least 0.3 wt % dienes, with the dienes including at least 10 wppm of a $C_4$ diene, at least 10 wppm of a $C_5$ diene, exits via line 78.

It is a convenience offered by the method of this invention that a mixed olefin and diene stream may be supplied with a minimum of separation and process steps. Unlike many other analogous processes, there is no need to employ many steps to provide stream concentrated in olefins and dienes or acetylenes of a single carbon number. As described directly above, most or all of any $C_4$-$C_8$ species from a given a primary conversion reaction may be produced together in a single stream. In another embodiment, fractional distillation tower 74 may have been operated such that a portion (e.g., almost all) of any propylene and MAPD present pressurized olefin bearing charge gas entering through line 72 is included in the first feedstock in line 78 along with the $C_4$-$C_8$ species. In an alternative embodiment, it may be convenient to develop a first feedstock from a mixture of only two different streams, for example, one containing a portion of the $C_4$ and $C_5$ species and almost all of the $C_6$ species present in a primary conversion reaction effluent created in one fractionation tower, and a second containing at least the balance of the $C_4$ and $C_5$ species. An example of that alternative embodiment involving two streams combined into a single first feedstock may be found in U.S. Patent Application Publication No. US 2005-0282038, the disclosure of which is hereby fully incorporated by reference herein. It will be recognized that an olefin generation unit and its associated separation section will typically comprise a number of other equipment items and unit operations, such as pumps, compressors, heat exchangers, flash drums, etc., that have been omitted here for the sake of succinctness and simplicity.

The first feedstock in line 78 can be mixed with a hydrogen-containing stream in line 80 and a cooled, hydrogenated product stream in line 82 to form a hydrogenation charge stream in line 84. The hydrogen-containing stream may be of any convenient concentration of hydrogen, for example, about 60 to 80 mol % as generally found in a refinery, with the balance being predominantly methane and preferably substantially free of carbon oxides. The hydrogen-containing stream in line 80 may be introduced at a rate corresponding to about 1.0 to about 1.5 mole of diatomic hydrogen (per se, exclusive of other components such as methane) per mole of total diene species found in the combined first feedstock in line 80 and cooled, hydrogenated product stream in line 82.

The combined first feedstock, hydrogen-containing stream, and cooled hydrogenated product stream in line 84 can be provided to adiabatic reactor 86. Reactor 86 contains a hydrogenation (e.g., noble metal-containing) catalyst suitable for the selective hydrogenation of dienes and/or acetylenes, and contacting of the hydrogenation catalyst, hydrogen, and dienes and/or acetylenes can take place within reactor 86, effecting the selective hydrogenation of those unsaturated species. At appropriate conditions within reactor 86, as discussed herein, the undesirable conversion of olefins to saturates can be minimized. A hydrogenation reactor effluent, containing a reduced quantity of dienes relative to the combined first feedstock, hydrogen-containing stream, and cooled hydrogenated product stream in line 84 can exit reactor 86 in line 88. The hydrogenation reactor effluent in line 88 may contain an appreciable quantity of hydrogen and other light material, such as methane, that was introduced with the hydrogen in line 80, and can thus be provided to a flash drum 90.

A vapor vent product can exit flash drum 90 in line 92. The vapor vent product in line 92 can contain substantially all of the hydrogen and any associated low molecular weight material in the hydrogenation reactor effluent, along with a portion of higher molecular weight material as associated with the given composition and thermodynamic equilibrium characteristics in flash drum 90. The vapor vent product in line 92 may have a number of useful dispositions, for example, as recycle to the hydrogen supply in line 80, potentially after increasing the hydrogen content via a membrane and subsequent compression, as recycle to the separation section of olefin generation unit 52, or use as a fuel gas for combustion, inter alia, or some combination of such dispositions.

A second feedstock containing at least 100 wppm and typically no greater than 4000 wppm (or preferably no greater than about 2500 wppm) of total $C_4$, $C_5$, and $C_6$ dienes can exit flash drum 92 in line 94. It is a convenience offered by the method of this invention, by virtue of the relatively high level of dienes called for in the second feedstock, that the proportion of hydrogen used relative to the diene species to be converted in reactor 86 may be relatively low, since a high driving force to achieve a lower diene content is not necessarily required. This has the benefit, inter alia, of providing a relatively low vapor vent stream to be managed. Similarly, the reactor 86 may be a single stage, allowing effective feedstock production in a single hydrogenation reactor at a single set of conditions without excessive undesirable secondary reaction of the olefins to saturates.

A first portion of the second feedstock can be diverted in line 96 to a heat exchanger cooler 98. The heat exchanger cooler 98 can cool the first portion of the second feedstock to a desired temperature, for example, in indirect exchange with cooling water, providing the cooled, hydrogenated product stream in line 82. The rate and temperature of the cooled, hydrogenated product stream in line 82 can be correlated with the composition of the first feedstock in line 78 and the requisite extent of selective conversion of dienes, such that a desired inlet temperature and temperature rise between the inlet and outlet of reactor 86 can be achieved, for example, less than about 50° F. (28° C.).

A second portion of the second feedstock can be provided in line 12, and an olefinic recycle stream containing no greater than 10 wt % $C_{10}$ olefins can be provided in line 14, such that the mass ratio of the flow of olefinic recycle in line 14 to the flow of feedstock in line 12 is at least 0.1 and typically no greater than 3.0. The combined materials can be provided via line 16 to feed/effluent heat exchanger 18 to form a first heated combined reactor feed in line 20. The first heated combined reactor feed in line 20 can be passed through a preheat exchanger 22 to form a second heated combined reactor feed in line 24. The unnumbered line through preheat exchanger 22 represents a heating medium, for example, 900 psig steam, and the second heated combined reactor feed in line 24 should be at a greater temperature than the first heated combined reactor feed in line 20, but have a temperature no greater than the desired oligomerization reaction temperature in heat exchanger reactor 27.

The second heated combined reactor feed in line 24 can be provided to heat exchanger reactor 27, where it flows through tubes 28, coming into contact with catalyst that contained within tubes 28. The rate of the second heated combined reactor feed in line 24 and amount of catalyst within the tubes 28 of heat exchanger reactor 27 can be such that a WHSV of at least 1.0 (preferably at least 1.5) can be achieved, based on the content of olefin in the second heated combined reactor feed in line 24.

The oligomerization reaction can thus occur within tubes 28, generating heat, and the heat can pass through tubes 28 to be absorbed by boiling water flowing around the outside of the tubes in shell side 30. The boiling water in shell side 30 is typically a mixture of steam and liquid water that can pass through line 38 to disengaging vessel 34. Make-up liquid boiler feed water can be provided in line 32 to disengaging vessel 34, and the combined liquid make-up boiler feed water and liquid water formed in the disengaging vessel 34 from the mixture of steam and liquid water that came through line 38 can exit the bottom of disengaging vessel 34 through line 36.

The steam generated in the heat exchanger reactor 27 can emanate from the top of disengaging vessel 34 through line 40, and may be used, for example, to provide heat in fractionation tower reboilers or to make electricity in turbogenerators. The liquid water in line 36 can then be provided to the shell side of heat exchanger reactor 27 to become the boiling water in shell side 30.

The presence of a relatively pure component, such as water, in a boiling state on the shell side 30 can provide a relatively constant temperature within shell side 30 and can, given other appropriate design considerations of heat exchanger reactor 27, provide for a close approach to isothermal conditions for the reaction occurring within tubes 28. The difference between the highest and lowest temperature within any, and/or between all, tubes 28 in heat exchanger reactor 27 can be no greater than 50° F. (28° C.), e.g., no greater than 40° F. (22° C.). Further, this configuration of heat exchanger reactor system 26 advantageously allows for relatively good control of the reaction temperature within tubes 28 through controlling the pressure within the disengaging vessel 34 (sometimes called a "steam drum"). Controlling the pressure in the steam drum 34 can facilitate control of the temperature at which the water will boil in shell side 30, the temperature being one of the key factors governing the rate of absorption of the heat of reaction within tubes 28. As the catalyst in tubes 28 typically deactivates with time on stream, a given level of conversion of olefins can be obtained by increasing the pressure in steam drum 34, thus increasing the boiling temperature of the fluid in shell side 30, and thereby increasing the temperature of the oligomerization reaction within tubes 28. Of course, the temperature of the boiling fluid in shell side 30 should preferably be kept lower than the desired oligomerization reaction temperature within tubes 28, conveniently at least 5° C. lower, such as at least 10° C. lower, including at least 15° C. lower, and in some cases at least 20° C. lower, but typically not exceeding 40° C. lower, in order to reduce the risk of introducing too great a radial temperature gradient within tubes 28 and of decreasing the isothermal nature of the oligomerization reaction within tubes 28.

The oligomerization reaction product can exit heat exchanger reactor 27 through line 42, and can be provided to feed/effluent exchanger 18. The cooled reaction product can exit feed/effluent exchanger 18 through line 44, and can be provided to separation device 46. Separation device 46 may include one or more well known elements, such as fractionation columns, membranes, and flash drums, inter alia, and can serve to separate the various components in the cooled reaction product in line 44 into various streams having differing concentrations of components than the cooled reaction product in line 44, including, but not limited to, for example, an olefinic recycle stream containing no greater than 10 wt % $C_{10}$ olefins in line 14. Also produced in separation device 46 can be a jet/kero product stream that contains at least 1 wt %, and preferably no greater than 30 wt %, $C_9$ non-normal olefins. Additionally, one or more purge streams may be produced by separation device 46 and can exit via line 50. Such purge streams in line 50 can conveniently include streams richer in saturated hydrocarbons than the feedstock stream in line 12, such as a $C_4$- rich stream containing unreacted butylenes and relatively concentrated $C_4$- aliphatics, or a portion of material of identical or similar composition to that of the olefinic recycle in line 14 and relatively concentrated in $C_{5+}$ aliphatics. Providing such purge streams can be convenient to controlling the partial pressure of olefins provided for reaction in heat exchanger reactor 27.

EXAMPLES

The invention will now be more particularly described with reference to the following examples.

Example 1

Olefinic feedstock and recycle materials were prepared as shown in Table 1 and were oligomerized over a catalyst comprising 65 wt. % of 0.02 to 0.05 micron crystals of ZSM-5 having a $SiO_2/Al_2O_3$ molar ratio of 50:1, and 35 wt. % of an alumina binder. The catalyst was in the form of 1/16 inch extrudates and about 90 cc of catalyst was blended with about 202 cc of inert, silicon carbide beads to reduce the heat generation per unit volume of reaction and placed in the reaction bed of a tubular reactor equipped with a heat management system that allowed the oligomerization reaction to proceed under near isothermal conditions.

TABLE 1

|  | Charge A | | Charge B | |
| --- | --- | --- | --- | --- |
|  | Feed | Recycle | Feed | Recycle |
| Wt. % | 49.52 | 50.48 | 41.84 | 58.16 |
| Proportion | 1 | 1.02 | 1 | 1.39 |
| Comp. Wt. % | | | | |
| Ethane | 0.00 | 0.00 | 0.00 | 0.00 |
| Ethylene | 0.00 | 0.00 | 0.00 | 0.00 |
| Propane | 0.00 | 0.00 | 0.01 | 0.00 |
| Propene | 0.00 | 0.00 | 0.00 | 0.00 |
| iso-butane | 7.24 | 0.10 | 0.99 | 0.02 |
| n-butane | 0.08 | 0.00 | 11.61 | 0.03 |
| t-butene-2 | 0.00 | 0.10 | 27.17 | 0.03 |
| butene-1 | 72.28 | 0.00 | 16.31 | 0.00 |
| iso-butene | 2.88 | 0.00 | 2.65 | 0.01 |
| c-butene-2 | 0.01 | 0.00 | 20.14 | 0.00 |
| iso-pentane | 0.01 | 0.09 | 0.80 | 0.04 |
| n-pentane | 1.72 | 0.00 | 1.56 | 0.04 |
| 1,3-butadiene | 0.00 | 0.00 | 0.05 | 0.00 |
| C5 olef | 15.75 | 0.10 | 17.28 | 0.15 |
| C6 sats | 0.00 | 0.00 | 0.17 | 0.00 |
| C6 olef | 0.02 | 0.54 | 1.24 | 1.27 |
| C7 olef | 0.00 | 1.30 | 0.00 | 3.20 |
| n-heptane | 0.00 | 8.13 | 0.00 | 10.65 |
| C8 olef | 0.00 | 73.71 | 0.00 | 55.56 |
| C9 olef | 0.00 | 15.14 | 0.00 | 27.68 |
| C10 olef | 0.00 | 0.79 | 0.00 | 1.31 |
| Total | 100.00 | 100.00 | 100.00 | 100.00 |

Over the course of this first experimental run, various charges were provided to the reactor to test performance under various conditions over an extended period of time. As the experimental run progressed, the catalyst activity declined, requiring an increase in reactor temperature later in the run to achieve a given conversion of feedstock olefins. In two particular experiments, the feedstock and recycle materials were blended in the proportions shown in Table 1, and the single blended stream ("Charge") was provided to the reactor at 1000 psig (7000 kPa) and other conditions shown in Table 2; wherein the WHSV is based on based on the olefin in the total charge (combined feed and recycle) and the total catalyst composition (ZSM-5 and binder). Four thermocouples were available, positioned evenly through the reaction bed in the reactor, with one very near the first point where the charge and catalyst come into contact, and one very near the outlet of the reaction bed. The difference between the highest and lowest temperatures within the reactor was from 2 to 7° C. The reaction product was analyzed with a gas chromatograph, and the composition of the products is provided in Table 2. No products having a carbon number greater than 21 were detected.

TABLE 2

|  | Experiment (ca. Days On Stream) | |
|---|---|---|
|  | 23 | 59 |
| Charge | A | B |
| Reactor T (° C.) | 235 | 274 |
| WHSV (1/hr) | 4.2 | 3.9 |
| Product Comp. Wt. % | | |
| Ethane | 0.00 | 0.00 |
| Ethylene | 0.00 | 0.00 |
| Propane | 0.01 | 0.01 |
| Propene | 0.06 | 0.05 |
| iso-butane | 3.56 | 0.46 |
| n-butane | 0.14 | 4.33 |
| t-butene-2 | 1.97 | 0.66 |
| butene-1 | 0.58 | 0.22 |
| iso-butene | 0.21 | 0.25 |
| c-butene-2 | 1.26 | 0.43 |
| iso-pentane | 0.10 | 0.41 |
| n-pentane | 0.06 | 0.58 |
| 1,3-butadiene | 0.00 | 0.00 |
| C5 olef | 1.63 | 1.51 |
| C6 sats | 0.06 | 0.11 |
| C6 olefins | 0.93 | 1.00 |
| C7 olefins | 1.61 | 2.34 |
| n-heptane | 4.62 | 6.63 |
| C8 olefins | 40.21 | 29.76 |
| C9 olefins | 15.78 | 18.99 |
| C10 olefins | 2.81 | 3.95 |
| C11 olefins | 2.52 | 3.16 |
| C12 olefins | 12.42 | 12.12 |
| C13-C15 olefins | 4.29 | 6.49 |

TABLE 2-continued

|  | Experiment (ca. Days On Stream) | |
|---|---|---|
|  | 23 | 59 |
| C16 olefins | 4.38 | 4.91 |
| C17-C20 olefins | 0.81 | 1.62 |
| Total | 100.00 | 100.00 |

Example 2

The same apparatus and procedure as Example 1 was utilized for a second, extended experimental run with a fresh batch of catalyst and another set of charge compositions as shown in Table 3. The olefinic feedstocks shown in Table 3 were produced by reacting methanol over a SAPO-34 catalyst generally according to the method of U.S. Pat. No. 6,673,978, with separation of the methanol reaction products to provide a $C_4$+ olefin composition. Over 90 wt. % of the olefins in each feed composition were normal in atomic configuration, and the feed composition further contained about 1000 wppm oxygenates, such as methanol and acetone (not shown in Table 3). Some minor adjustments of some components in the feed compositions were made by additions of reagent grade materials to test certain aspects of the operation.

The olefinic recycle compositions shown in Table 3 were produced by taking accumulated batches of the reaction products from the first and this second experimental run and periodically providing those batches to a fractionation tower to separate a distillate product from a light olefinic recycle material, collecting those fractionated materials, and using the fractionated light olefinic recycle material for subsequent experiments. Over 90 wt. % of the olefins in each recycle composition were non-normal in atomic configuration. Some minor adjustments of some components in the recycle compositions were made via addition of reagent grade materials to account for unavoidable losses in the fractionation step and test certain other aspects of the operation.

TABLE 3

|  | Charge C | | Charge D | | Charge E | | Charge F | |
|---|---|---|---|---|---|---|---|---|
|  | Feed | Recycle | Feed | Recycle | Feed | Recycle | Feed | Recycle |
| Wt. % | 38.31 | 61.69 | 45.45 | 54.55 | 49.72 | 50.28 | 47.62 | 52.38 |
| Proportion | 1 | 1.61 | 1 | 1.20 | 1 | 1.01 | 1 | 1.10 |
| Comp. Wt. % | | | | | | | | |
| Butane | 2.02 | 16.62 | 2.29 | 9.99 | 2.80 | 9.28 | 2.13 | 7.53 |
| Butenes | 63.50 | 3.05 | 64.35 | 2.69 | 64.55 | 2.97 | 64.93 | 3.09 |
| Dienes | 0.10 | 0.00 | 0.09 | 0.00 | 0.08 | 0.00 | 0.06 | 0.00 |
| Pentane | 0.54 | 4.72 | 1.75 | 0.19 | 1.37 | 0.97 | 1.50 | 1.85 |
| Pentenes | 21.75 | 1.69 | 20.84 | 2.25 | 20.69 | 2.49 | 21.09 | 2.25 |

TABLE 3-continued

|  | Charge C | | Charge D | | Charge E | | Charge F | |
| --- | --- | --- | --- | --- | --- | --- | --- | --- |
|  | Feed | Recycle | Feed | Recycle | Feed | Recycle | Feed | Recycle |
| Hexanes | 0.25 | 0.13 | 0.26 | 0.13 | 0.18 | 0.29 | 0.17 | 0.54 |
| Hexenes | 11.81 | 1.27 | 10.40 | 3.10 | 10.31 | 3.52 | 10.10 | 4.29 |
| Heptenes | 0.01 | 2.98 | 0.01 | 3.37 | 0.01 | 3.24 | 0.01 | 3.39 |
| n-Heptane | 0.00 | 6.63 | 0.00 | 7.46 | 0.00 | 7.64 | 0.00 | 8.05 |
| Octenes | 0.02 | 44.09 | 0.01 | 49.63 | 0.01 | 48.90 | 0.01 | 52.84 |
| Nonenes | 0.00 | 18.64 | 0.00 | 20.99 | 0.00 | 20.52 | 0.00 | 16.17 |
| Decenes | 0.00 | 0.18 | 0.00 | 0.20 | 0.00 | 0.19 | 0.00 | 0.00 |
| Total | 100.00 | 100.00 | 100.00 | 100.00 | 100.00 | 100.00 | 100.00 | 100.00 |

For a number of particular experiments using the charge material and proportions shown in Table 3, the butylene conversion and yield of $C_{10}+$ material in the reactor product for each of the charge compositions under a variety of temperatures and approximate days on stream are provided in Table 4. In all of the experiments shown in Table 4, the total reactor pressure was about 1000 psig (7000 kPa), the WSV was between 3.5 and 4.0 based on the olefin in the total charge (combined feed and recycle) and the total catalyst composition (ZSM-5 and binder), and the difference between the highest and lowest temperatures within the reactor was 10° C. or less.

TABLE 4

| Experiment (Days on Stream) | Charge | Reactor T (° C.) | C4= conversion (wt. %) | C10+ yield (wt. %) |
| --- | --- | --- | --- | --- |
| 2 | C | 207 | 93.3 | 38.0 |
| 3 | C | 212 | 97.9 | 43.4 |
| 5 | C | 211 | 91.9 | 36.0 |
| 8 | C | 211 | 87.9 | 32.1 |
| 13 | D | 221 | 98.4 | 46.3 |
| 14 | D | 220 | 96.3 | 41.6 |
| 15 | D | 220 | 95.5 | 40.2 |
| 17 | D | 220 | 92.4 | 37.1 |
| 20 | E | 225 | 95.6 | 40.1 |
| 24 | E | 227 | 94.6 | 38.3 |
| 32 | E | 233 | 95.1 | 37.4 |
| 41 | E | 244 | 96.2 | 37.6 |
| 46 | E | 247 | 96.2 | 37.5 |
| 51 | E | 253 | 97.2 | 38.7 |
| 55 | F | 252 | 94.9 | 33.0 |
| 57 | F | 255 | 96.0 | 33.5 |
| 59 | F | 259 | 97.0 | 37.0 |
| 62 | F | 259 | 96.8 | 36.0 |

Example 3

Several batches of distillate materials were produced from the fractionation of various batches of reactor product obtained in the first and second experimental runs. The carbon number distribution of those distillate material batches, via the Linear Paraffin GC method, are provided in Table 5. Distillates 1 and 2 in Table 5 were obtained from fractionation operations using the aggregate reactor product from the first experimental run, while Distillate 3 was obtained from fractionation operations of the aggregate reactor product from Charges C, D and E of the second experimental run. All of the distillate materials contain all of the $C_{11}+$ and almost all of the $C_{10}$ material present from the reaction products, i.e., no separation of any components heavier than $C_{11}$ was conducted on the reactor product in obtaining the distillate materials. As obtained directly from the reactor product via the fractionation tower, all the distillate materials are over 90 wt. % non-normal olefins, and further contain very low amounts of aromatics (<100 wppm).

Example 4

The batches of distillate materials obtained in Example 3 were hydrogenated in discrete batches by reacting them with hydrogen over a hydrogenation catalyst. Distillates 1 and 2 were hydrogenated over a nickel-containing catalyst while Distillate 3 was hydrogenated over a palladium-containing catalyst, each according to operations and conditions well known. The carbon number distribution of the distillates are provided in Table 5 and in Table 5A. Hydrogenation did not significantly change the non-normal character of distillate compositions although, following hydrogenation, the distillate materials were almost completely aliphatic. No products having a carbon number greater than 21 were detected. Table 5 provides the carbon number distribution according to the Linear Paraffin method, which defines carbon number between two adjacent linear paraffins and integrates each normal peak separately.

In Table 5A the carbon distribution of the non-hydrogenated distillate samples is given. It gives the carbon or isomer distribution. $C_n$ is then defined as all isomers with carbon number "n". With the linear paraffin method what is defined as $C_n$, can contain, e.g., a $C_{n-1}$ or $C_{n+1}$ isomer due to overlapping GC peaks. As a result, there are differences between the carbon distribution in Table 5 and 5A for the same distillate samples.

The GC analysis data for both Table 5 and 5A were collected on a PONA Gas Chromatograph. On this GC, the distillate sample, prior to entering the GC separation column, is co-injected with hydrogen across a small reactor bed containing saturation catalyst. All the olefinic material in the distillate sample to the GC separation column is thus saturated (if not yet saturated before by hydrogenation). However, it is believed that the carbon number distribution (CND) measured herein are accurate.

TABLE 5

| | Distillate | | |
| --- | --- | --- | --- |
| | 1 | 2 | 3 |
| Comp (wt. %) | Before and after hydrogenation | | |
| C4-C7 | 0.06 | | 0.06 |
| C8 | 0.05 | | 0.10 |
| C9 | 4.80 | | 12.58 |
| C10 | 8.66 | | 12.59 |
| C11 | 16.24 | | 14.30 |
| C12 | 31.99 | | 22.84 |

TABLE 5-continued

| | Distillate | | | |
|---|---|---|---|---|
| | 1 | 2 | 3 | |
| Comp (wt. %) | Before and after hydrogenation | | | |
| C13 | 12.78 | | 11.65 | |
| C14 | 5.72 | | 6.92 | |
| C15 | 8.13 | | 7.66 | |
| C16 | 5.78 | | 5.29 | |
| C17 | 2.15 | | 2.53 | |
| C18 | 1.46 | | 1.73 | |
| C19 | 1.24 | | 1.07 | |
| C20 | 0.96 | | 0.70 | |
| Total | 100.00 | 0.00 | 100.00 | |
| % normal paraffins | 3.17 | | 2.75 | |

TABLE 5A

| | Distillate | | |
|---|---|---|---|
| | 1 | 2 | 3 |
| Comp (wt. %) | Before hydrogenation | | |
| C4-C7 | 0.25 | 0.42 | 0.68 |
| C8 | 0.35 | 0.95 | 1.03 |
| C9 | 4.94 | 19.76 | 13.25 |
| C10 | 8.69 | 9.35 | 12.95 |
| C11 | 8.46 | 7.45 | 8.11 |
| C12 | 39.13 | 32.44 | 29.17 |
| C13-C15 | 16.72 | 14.87 | 15.99 |
| C16 | 15.85 | 11.16 | 13.80 |
| C17-C20 | 5.61 | 3.59 | 5.01 |
| Total | 100.0 | 100.0 | 100.0 |

Table 6 provides composition and other physical and fuel performance properties of the hydrogenated distillate materials.

TABLE 6

| | Distillate | | | |
|---|---|---|---|---|
| | 1 | 2 | 3 | |
| | After hydrogenation | | | |
| Distillation T10 (° C.) | 188 | 165 | 171 | ASTM D86 |
| Distillation T90 (° C.) | 265 | 250 | 269 | ASTM D86 |
| Distillation End Point (° C.) | 304 | 293 | 308 | ASTM D86 |
| Flash Point (° C.) | 57 | 42 | 47 | ASTM D56 |
| Density @ 15° C. (kg/l) | 0.767 | 0.756 | 0.765 | ISO 12185 |
| Viscosity @ 40° C. (mm2/s) | 1.53 | 1.26 | 1.42 | ASTM D445 |
| Viscosity @ 20° C. (mm2/s) | 2.16 | 1.72 | | ASTM D445 |
| Viscosity @ −20° C. (mm2/s) | 6.06 | 4.15 | | ASTM D445 |
| Freeze Point (° C.) | −56 | −62 | <−50 | ASTM D2386 |
| Aromatics (wppm) | 25 | | 49 | Ultra-violet |
| Sulfur (wppm) | <0.1 | <0.1 | <0.1 | ASTM D2622 |
| Olefins (wt. %) | <0.01 | <0.01 | <0.01 | ASTM D2710 |
| Appearance | Clear and Bright | | | visual |
| Acidity (mg KOH/g) | 0.02 | 0.01 | | ASTM D3232 |
| Heat of Combustion (MJ/kg) | 78.72 | 79.22 | | ASTM D3338 |
| Smoke Point (mm) | 45 | 41 | | ASTM D1322 |
| Copper Strip Corrosion | 1a | 1a | | ASTM D130 |
| JFTOT Breakpoint (° C.) | 295 | >315 | | ASTM D3241 |
| Existent Gum (mg/100 ml) | 2 | 1 | | ASTM D381 |
| Hydrogen Content (wt. %) | 14.51 | 15.12 | | ASTM D3343 |

TABLE 6-continued

| | Distillate | | | |
|---|---|---|---|---|
| | 1 | 2 | 3 | |
| | After hydrogenation | | | |
| Microseparator (rating) | 100 | 99 | | ASTM D3948 |
| Electrical Conductivity (pS/m) | 0 | 0 | | ASTM D2642 |
| Peroxides (mg/kg) | 0.9 | 0.6 | | ASTM D3703 |
| Cetane Number | 48.2 | 47.0 | | ASTM D613 |

Example 5

A sample of JP-8 military grade aviation fuel, derived from standard petroleum stocks and processes and containing standard additives, was obtained from the ExxonMobil Baytown Refinery. A blend of 25 wt % of the hydrogenated Distillate 1 from Example 4 and 75 wt % of the JP-8 was prepared. Table 7 provides carbon number distribution, physical property and other composition information on the JP-8 and blended material. Of particular interest is that the distillation end point of the blend of Distillate 1 with JP-8 has a lower distillation end point than does neat Distillate 1.

TABLE 7

| | Distillate | | |
|---|---|---|---|
| Comp (wt. %) | JP-8 | 25 wt. % Dist. 1/ 75 wt. % JP-8 | Test Method |
| C4-C7 | 0.77 | | GC (L. Paraffin) |
| C8 | 2.03 | | GC (L. Paraffin) |
| C9 | 3.90 | | GC (L. Paraffin) |
| C10 | 8.77 | | GC (L. Paraffin) |
| C11 | 15.28 | | GC (L. Paraffin) |
| C12 | 18.26 | | GC (L. Paraffin) |
| C13 | 18.27 | | GC (L. Paraffin) |
| C14 | 14.73 | | GC (L. Paraffin) |
| C15 | 10.84 | | GC (L. Paraffin) |
| C16 | 5.35 | | GC (L. Paraffin) |
| C17 | 1.50 | | GC (L. Paraffin) |
| C18 | 0.28 | | GC (L. Paraffin) |
| C19 | 0.03 | | GC (L. Paraffin) |
| C20 | 0.01 | | GC (L. Paraffin) |
| Total | 100.0 | | |
| Distillation T10 (° C.) | 185 | 185 | ASTM D86 |
| Distillation T90 (° C.) | 254 | 256 | ASTM D86 |
| Distillation End Point (° C.) | 269 | 283 | ASTM D86 |
| Flash Point (° C.) | 45 | 48 | ASTM D56 |
| Density @ 15° C. (kg/l) | 0.8141 | 0.8018 | ISO 12185 |
| Viscosity @ 40° C. (mm2/s) | 1.48 | | ASTM D445 |
| Viscosity @ 20° C. (mm2/s) | 2.05 | | ASTM D445 |
| Freeze Point (° C.) | <−50 | <−50 | ASTM D2386 |
| Aromatics (vol. %) | 25.2 | 18.9 | ASTM D1319 |
| Sulfur (wppm) | 190 | 140 | ASTM D2622 |

Example 6

Figure 5:
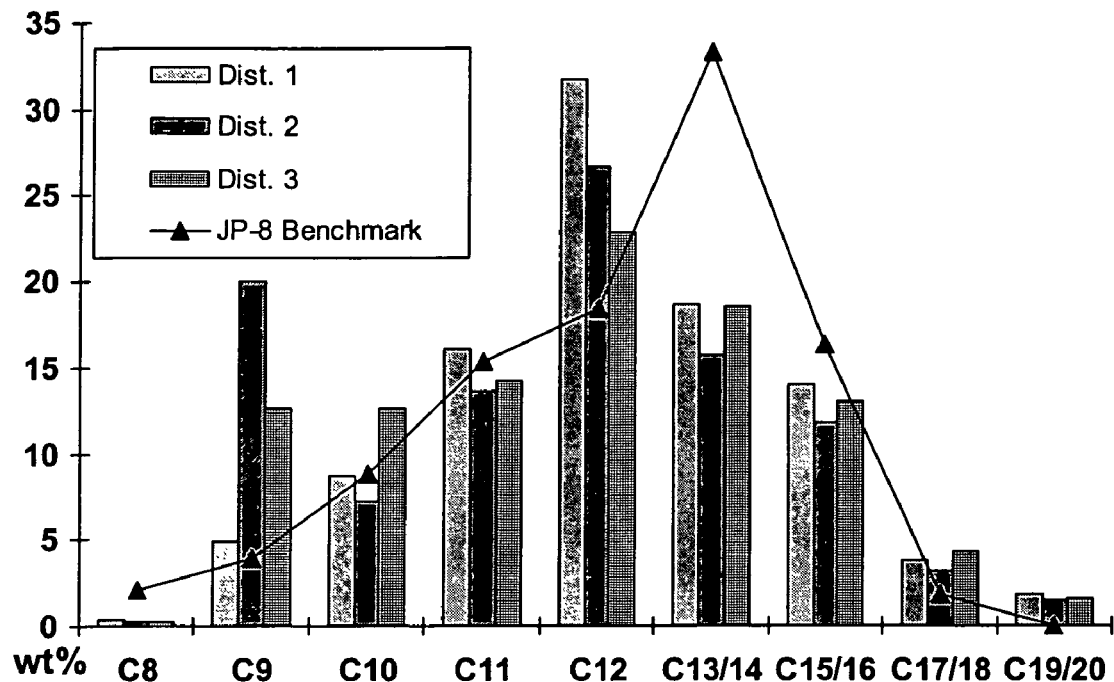
FIG. 5 is a plot of carbon number distributions of distillate products with varying amounts of dienes and made by processes according to the invention, as compared to a benchmark distillate product.

The carbon number distributions of Distillates 1, 2, and 3 as produced in the previous examples, along with that of the conventionally produced JP-8 benchmark, are plotted in FIG. 5. It can be seen that the distillate material obtained by the method according to the present invention can provide a relatively similar distribution to a conventionally produced distillate, making them more straightforward to blend with one another. The blending benefits of the novel material with the conventional material, for example, in reduced freezing point or aromatics content, may be obtained without creating dislocations in the carbon number distribution and boiling curve of the blended material. This is in contrast to the results noted in Example 7, below, in which a high concentration of butenes were used in the feed, wherein the products were predominantly integer oligomers of butenes with substantial carbon number gaps.

Example 7

A number of synthetic blends of a combined second feedstock and an olefinic recycle stream were prepared. The second feedstock was represented by a mixture of normal butenes, isobutane, normal heptane, and, in some cases, butadiene. The olefinic recycle stream was represented by a mixture of many isomers of octene that had been produced via the dimerization of normal butenes over a ZSM-57 catalyst at appropriate conditions to cause dimerization, and subsequently separated from the ZSM-57 reaction effluent. The olefinic recycle stream comprised about 2 wt % normal, about 27 wt % mono-methyl branched, about 67 wt % di-methyl branched, and about 4 wt % tri-methyl branched octenes, the branches being relatively randomly distributed on the molecule backbone. There were no ethyl groups or higher observed on any of the olefinic recycle stream molecules. The contents of the synthetic blends contained, with regard to olefins and saturates on a butadiene free basis, about 36 wt % butenes, about 10 wt % isobutane, about 10 wt % normal heptane, and about 44 wt % octenes. One of the synthetic blends contained no butadiene ("Clean Feed"), and thus the final content of the synthetic blend was unchanged. To the other blends, butadiene was added, such that one of the final synthetic blends contained about 1000 wppm butadiene, another contained about 2500 wppm butadiene, and still another contained about 6.5 wt % butadiene; the proportions of the other components in the final synthetic blends were thus their normalized concentration with those levels of butadiene.

These synthetic blends were contacted with a combination of about 65 wt % ZSM-5 and about 35 wt % inactive binder catalyst, as described herein, in a reactor at a temperature of about 220° C., a pressure of about 1000 psig, and a WHSV based on the total catalyst plus binder weight of about 28 hr$^{-1}$, in order to cause an olefin oligomerization reaction according to the present invention. These conditions were maintained constant throughout a given experiment. A high WHSV was used to exaggerate the rate of catalyst deactivation to facilitate catalyst deactivation measurement over a relatively short period of time, generally less than one day for each experiment. The concentrations of components in the ZSM-5 catalyst reaction effluent were measured frequently with a gas chromatograph.

Components in the reactor effluent were almost exclusively unreacted butenes, octenes, and saturates found in the synthetic blends, and higher molecular weight oligomers of $C_{12}$, $C_{16}$, and $C_{20}$. Virtually no carbon species greater than $C_{20}$ were seen. Conversion of butenes in the synthetic blends was monitored with time on stream, was measured as catalyst productivity, or was measured as catalyst life ("catlife"; i.e., tons of $C_{12+}$ product/distillate in the effluent, divided by tons of total catalyst in the reactor). Any decline of the conversion of butenes with time on stream was taken as an indication of the deactivation of the catalyst with regard to the oligomerization reaction, which was believed to be caused by the build-up of undesirable carbonaceous deposits on the catalyst. Lower rates of deactivation are desirable, as this extends the time the catalyst may remain on stream in the process of the present invention without requiring shutdown of the equipment for catalyst regeneration, and correspondingly reducing the expense and effort associated therewith.

Each experiment began by running the same "Clean Feed" synthetic blend containing no butadiene into the reactor at the aforementioned oligomerization conditions. One experiment, conducted as a control, ran nothing but the Clean Feed for the entire experiment. For the other experiments, at a time on stream of about 125 tons of product per ton of catalyst, the Clean Feed synthetic blend was quickly switched to that having a given concentration of butadiene.

Figure 3:
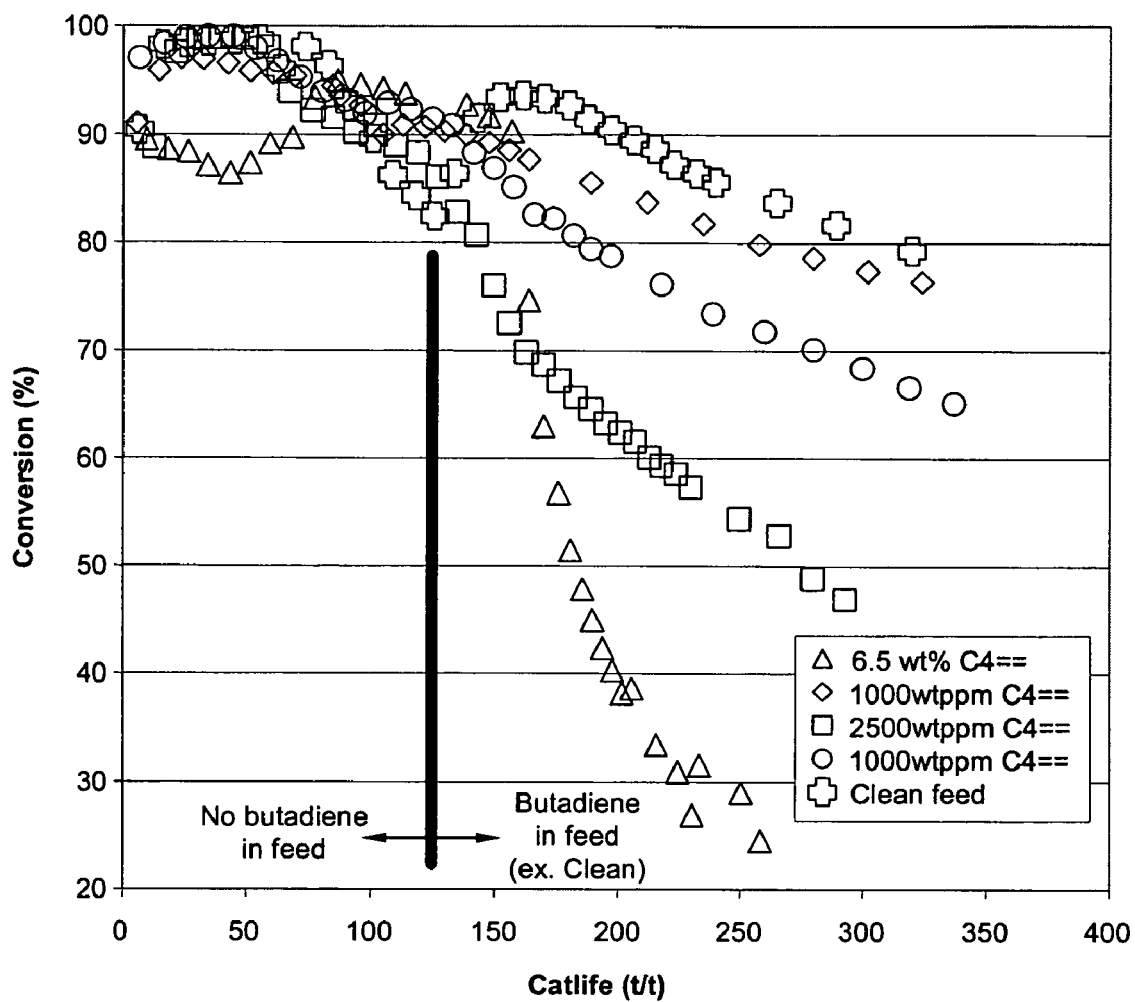
FIG. 3 is a plot of oxygenate conversion vs. catalyst life in the presence of a varying amount of dienes for oligomerization processes described in the present application.

With respect to FIG. 3, the slope of the deactivation curves of each of the given synthetic blends is worth noting. It can be seen that there is no significant difference in the slope of the deactivation curves for the control experiment using nothing but Clean Feed and those for the two other experiments with the synthetic blend containing a butadiene content of about 1000 wppm. However, the other two experiments using about 2500 wppm and about 6.5 wt % butadiene in the synthetic blends, respectively, show a significantly higher slope of the deactivation curve, corresponding to more rapid deactivation, with the effect in relatively direct proportion to the concentration of butadiene. Any differences in the results of the various experiments on the period of time of Clean Feed, as well as the differences in the y-intercepts of the deactivation curves on the various synthetic blends are believed to be artifacts of the experimental protocol and apparatus at exaggerated WHSV conditions. It is noteworthy, however, that all the Clean Feed results become relatively close at about the 125 t/t mark.

Example 8

The first feedstocks shown in Table 8 below, Cylinder A, Cylinder B and Cylinder C were produced by reacting methanol over a SAPO-34 catalyst generally according to the method disclosed in U.S. Pat. No. 6,673,978, with separation of the methanol reaction products to provide a $C_{4+}$ olefin composition; over 90 wt % of the olefins in each feed composition were normal in atomic configuration. These first feedstocks also contained about 1500 wppm of various oxygenated molecules (primarily ethanal, acetone, DME, and methanol).

TABLE 8

| Composition, wt % | Cylinder A | Cylinder B | Cylinder C |
|---|---|---|---|
| Butadiene | 2.7 | 2.7 | 0.02 |
| Pentadiene | 0.9 | 1.0 | 2.2 |
| Butene-1 | 21.0 | 18.3 | 0.2 |
| Butene-2 | 51.4 | 53.2 | 53.3 |
| Iso-butylene | 3.0 | 2.8 | 0.0 |
| C4 saturates | 1.4 | 1.3 | 0.4 |
| Pentenes | 17.9 | 18.7 | 35.1 |
| C5 saturates | 0.5 | 0.5 | 0.8 |
| C6+ olefins | 1.1 | 1.4 | 6.9 |
| C6+ saturates | 0.1 | 0.1 | 0.1 |
| Total | 100.0 | 100.0 | 100.0 |

The first feedstocks in Cylinders A, B and C were mixed with 99.9 mol % hydrogen and contacted in an isothermal, tubular reactor with 324 grams of a selective diene hydrogenation, noble metal-containing, catalyst, namely LD-265 available commercially from Axens, containing 0.3 wt % palladium supported on alumina. The contacting occurred at the conditions noted in Tables 9, 10, and 11. The reactor effluent was cooled to about 40° C. and flashed at pressure near the reactor pressure to remove any unreacted hydrogen and produce the second feedstocks indicated with a reduced level of dienes. Prior to the contacting, the noble metal containing catalyst was activated by an in-situ reduction using 200 liter/hr of the hydrogen only at a temperature of 145° C. and a pressure of 16 bar for a period of 24 hours. The WHSV of the selective diene hydrogenation reaction can be calculated as: [Butene feed (g/h)+(Hydrogen feed (1/h)*2/22.4)]/ 324 g.

TABLE 9

Cylinder A

| | | | |
|---|---|---|---|
| $H_2$/dienes feed ratio (mole/mole) | 0.8 | 1.5 | 1.2 |
| Temp, ° C. | 65 | 65 | 65 |
| WHSV | 3.1 | 3.1 | 3.1 |
| Reactor pressure, bar | 17.5 | 18.8 | 18.8 |
| Collecting drum pressure, bar | 15 | 18.5 | 18.5 |
| C4 saturates in feed, % | 1.4 | 1.4 | 1.4 |
| C4 saturates in product, % | 1.6 | 3.1 | 2.1 |
| C5 saturates in feed, % | 0.5 | 0.5 | 0.5 |
| C5 saturates in product, % | 0.5 | 0.7 | 0.6 |
| Butadiene conversion, % | 64.7 | 99.98 | 96.5 |
| Pentadiene conversion, % | 33.7 | 99.6 | 79.6 |
| Total dienes left, ppm | 15926 | 39 | 2871 |

TABLE 10

Cylinder B

| | | | | |
|---|---|---|---|---|
| $H_2$/dienes feed ratio (mol/mol) | 1.46 | 1.39 | 1.34 | 1.19 |
| Temp, ° C. | 65 | 65 | 65 | 65 |
| WHSV | 4.6 | 4.6 | 4.6 | 4.6 |
| Reactor pressure, bar | 20 | 21.1 | 22.4 | 21 |
| Collecting drum pressure, bar | 18.5 | 18.5 | 18.5 | 18.5 |
| C4 saturates in feed, % | 1.3 | 1.3 | 1.3 | 1.3 |
| C4 saturates in product, % | 2.3 | 2.2 | 2.3 | 1.8 |
| C5 saturates in feed, % | 0.5 | 0.5 | 0.5 | 0.5 |
| C5 saturates in product, % | 1.2 | 0.6 | 0.6 | 0.5 |
| Butadiene conversion, % | 99.6 | 99.97 | 99.98 | 99.5 |
| Pentadiene conversion, % | 94.1 | 99 | 98.7 | 84.8 |
| Total dienes left, ppm | 440 | 64 | 79 | 983 |

TABLE 11

Cylinder C

| | |
|---|---|
| $H_2$/dienes feed ratio (mol/mol) | 1.58 |
| Temp, ° C. | 75 |
| WHSV | 6.8 |
| Reactor pressure, bar | 17.3 |
| Collecting drum pressure, bar | 15.9 |
| C4 saturates in feed, % | 0.4 |
| C4 saturates in product, % | 1.1 |
| C5 saturates in feed, % | 0.8 |
| C5 saturates in product, % | 1.3 |
| Butadiene conversion, % | 100 |
| Pentadiene conversion, % | 97.1 |
| Hexadiene conversion, % | 94.6 |
| Total dienes left, ppm | 676 |

The concentration of oxygenates in the second feedstocks noted above in Tables 9, 10, and 11 were about the same as that of the first feedstock.

In other similar selective diene hydrogenation procedures of first feedstocks produced from the same oxygenate conversion process, the level of oxygenates (primarily ethanal, acetone, DME, and methanol) in the first feedstocks was as high as 3500 wppm, and no adverse effects on the hydrogenation (noble metal-containing) catalyst were observed. For example, diene conversion at similar conditions was about the same at about 3500 wppm oxygenates in the first feedstock as obtained with about 1500 wppm oxygenates in the first feedstock.

Example 9

Figure 4:
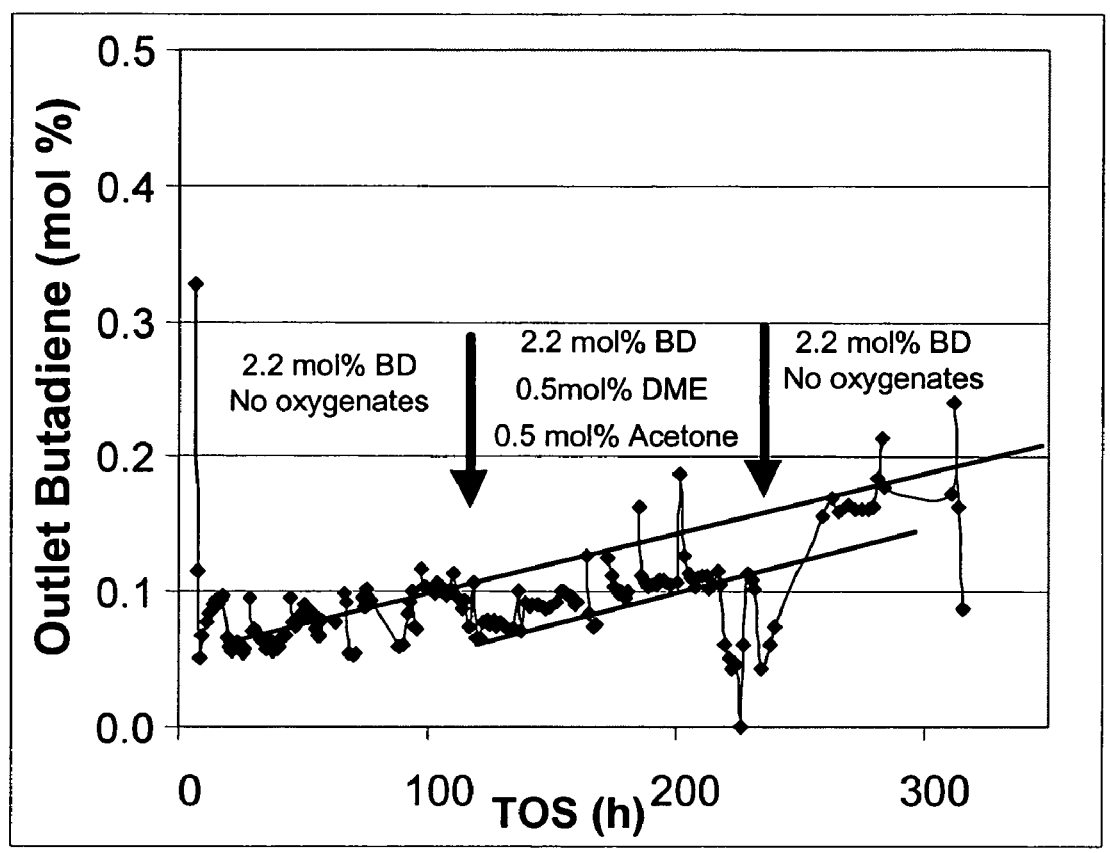
FIG. 4 is a plot representing the deactivation of molecular sieve in the presence of dienes during process described in the present application.

A synthetic first feed was prepared containing about 2.2 mol % butadiene, about 84.6 mol % butenes, about 6.1 mol % butane, about 5.7 mol % pentenes, and about 1.4 mol % hexenes. This synthetic first feed was divided into one portion unaltered, with another portion blended to obtain a first feed containing about 0.5 mol % DME and about 0.5 mol % acetone, and with the balance of components normalized to this concentration of oxygenates. These two first feed materials were contacted with Axens LD-265 catalyst at about 50° C., about 240 psig pressure, a WHSV of about 5.0, and a diatomic hydrogen to butadiene molar ratio of about 1.1. The first feed with no oxygenates was run for about 120 hours; then the first feed was switched to that containing the oxygenates for some time until about 225 hours. Then, the first feed was switched back to that containing no oxygenates. Referring to the results of this experiment in FIG. 4, the performance of the noble metal-containing catalyst in selectively removing dienes to produce a second feed was found similar on either first feed in terms of the decline in activity with time (slope of increase in diene content in the product with time on stream), indicating no adverse impact resulting from the presence of the oxygenates.

It should be noted that the olefinic recycle stream of the method of the present invention, or a portion thereof in the form of a purge stream from a separation device, as discussed in the description of FIGS. 1 and 2, can be a valuable product in its own right for a number of commercial uses.

For example, a purge stream rich in $C_4$ hydrocarbons may be utilized as a fuel gas for combustion to generate heat within equipment employed in the process of the present invention, or for other elements of a greater facility within which such process may be a part. It may additionally or alternately be used as a feedstock for any other process requiring $C_4$ olefins or paraffins.

In one embodiment, a $C_{5+}$ purge stream can have good qualities as a motor gasoline for use in internal combustion engines, or as a blendstock with other synthetic or petroleum derived materials in the production of a motor gasoline. Typically, a $C_{5+}$ purge stream, similar in composition to the olefinic recycle stream but having most or all of any $C_{4-}$ components removed, can have an octane number (simple average of the Research plus Motor Octane numbers or "(R+M)/2") greater than 80, typically at least about 85. This occurs in large part by virtue of the high levels of non-normal olefins contained in the stream, which is generally at least about 20 wt % or at least about 50 wt %, and generally less than about 95 wt % or less than about 80 wt %, since it also comprises almost all of the $C_{5+}$ saturates in the feed. Such a stream may also have other suitable motor gasoline properties such as good storage stability, relatively low vapor pressure, and appropriate boiling range.

Further, one peculiar and valuable facet of the method of the present invention is that the oligomerization reaction can provide an oligomerization effluent stream that is remarkably high in what may be termed "true oligomers," i.e., dimers or higher oligomers that are produced solely from the chemical joining of one or more feedstock and/or recycle olefins. Alternatively stated, there is often surprisingly little cracking of any higher carbon number oligomer products to lower carbon number olefins, and almost all of the products are statistically feasible dimers, trimers, tetramers, etc., of the olefins in the feedstock and olefinic recycle stream. Further, there can be remarkably little hydrogen transfer activity, including the generation of various saturated components such as butanes, octanes, etc. All of these features in large part can account for the relatively high life cycle of the catalyst, that is, the relatively high productivity of distillate from each unit weight of catalyst employed prior to the catalyst requiring regeneration.

For this reason, in another embodiment, it may be quite attractive to utilize the method of the present invention to co-produce higher olefins, for example $C_8$ and/or $C_9$ olefins, for subsequent processing into plasticizer alcohols. Such alcohols may be produced, for example, by hydroformylation with carbon monoxide over a cobalt catalyst to make an aldehyde which is then hydrogenated to the alpha alcohol. Proper selection of the first feedstock can provide an oligomerization reaction product advantageous for subsequent separation of the olefinic recycle stream or purge stream derived therefrom to obtain the desired higher olefin for hydroformylation. For example, choosing a first feedstock very low in propylene content and rich in $C_{4+}$ olefins can provide an oligomerization reaction product rich in octenes and very low in heptenes, significantly simplifying the separation required to obtain a stream containing a high concentration of the desired octenes. It is a much easier task to separate octenes from hexenes than from heptenes.

In addition, alternative separation schemes producing various olefinic recycle and purge streams may be applied to the present invention to further enhance this co-production capability of either motor gasoline or higher olefins for chemical use. Further, the method of the present invention may be employed by modifying existing commercial oligomerization processes for an efficient transformation from higher olefins or motor gasoline production to distillate production with higher olefins or motor gasoline co-production. For example, it would be straightforward to take an existing solid phosphoric acid polymogas unit feeding FCCU olefins, replace the solid phosphoric acid with a suitable molecular sieve oligomerization catalyst, modify and/or augment the fractionation capability associated with the polymogas unit to provide a suitable olefinic recycle and one or more purge streams, and transform the unit to one producing a distillate stream, and potentially co-producing higher olefins for plasticizer alcohol production or motor gasoline.

Example 10

During the oligomerization experiments detailed in Example 2, a second feedstock and an olefinic recycle stream as shown in Table 12 were oligomerized. The second feedstock in Example 2 and this Example were produced according to Example 8 from a first feedstock obtained via the conversion of methanol to olefins. Reaction conditions were 70 bar (gauge), 265° C., with a butene conversion of 95.9% at a run time of 95 days.

The oligomerization effluent stream was analyzed and the $C_{6+}$ olefinic material contained therein, that is, the $C_{6+}$ olefin selectivity of the effluent having removed the impact of the added n-heptane marker material provided in the recycle stream, had the composition shown in Table 13. Note the very low concentration of $C_7$ olefins, which is based on a feed and recycle that contain no propylene, cannot be made by any other means than cracking of higher carbon number olefins. The $C_7$ olefins content generated with each pass through the reactor is relatively small, and those present in the oligomerization effluent stream typically result from a build-up of the material in the recycle operation. This demonstrates the high selectivity to true oligomers using the method of the present invention, and the advantaged capability to process the oligomerization effluent stream or derivative streams therefrom to produce of higher olefins, for example octenes, for use in producing plasticizer alcohols.

TABLE 12

|  | Charge G | |
| --- | --- | --- |
|  | Feed | Recycle |
| Wt. % | 47.6 | 52.4 |
| Comp. Wt. % |  |  |
| Butane | 2.4 | 7.7 |
| Butenes | 64.1 | 2.4 |
| Total Dienes | 0.1 | 0.0 |
| Pentane | 1.3 | 1.9 |
| Pentenes | 21.6 | 2.2 |
| Hexanes | 0.1 | 0.5 |
| Hexenes | 10.5 | 3.7 |
| Heptenes | 0.0 | 3.4 |
| n-Heptane | 0.0 | 8.2 |
| Octenes | 0.0 | 53.6 |
| Nonenes | 0.0 | 16.3 |
| Decenes | 0.0 | 0.0 |
| Total | 100.0 | 100.0 |

TABLE 13

| Product Carbon Number | Wt % Selectivity |
| --- | --- |
| C6 | 2.5% |
| C7 | 2.7% |
| C8 | 33.4% |
| C9 | 18.8% |
| C10 | 7.5% |
| C11 | 4.5% |
| C12 | 14.0% |
| C13-15 | 9.1% |
| C16 | 6.0% |
| C17+ | 1.5% |

Example 11

During the oligomerization experiments detailed in Example 2, a second feedstock and an olefinic recycle stream as shown in Table 14 were oligomerized. The second feedstock in Example 2 and this Example were produced according to Example 8 from a first feedstock obtained via the conversion of methanol to olefins. The recycle was prepared from separation of the oligomerization effluent as noted in Example 2, but for this particular experiment, a relatively pure stream of octenes was produced and used as the olefinic recycle stream, without employing a n-heptane marker. Reaction conditions were 70 bar (gauge), 269° C., with a butene conversion of 95.2% at a run time of 101 days.

The oligomerization effluent stream was analyzed and the $C_{6+}$ olefinic material contained therein had the composition shown in Table 15. Again, note the very low concentration of $C_7$ olefins, which is based on a feed and recycle that contain no propylene, cannot be made by any other means than cracking of higher carbon number olefins. This further demonstrates the relatively high selectivity to true oligomers using the method of the present invention.

TABLE 14

| | Charge H | |
|---|---|---|
| | Feed | Recycle |
| Wt. % | 48.96 | 51.04 |
| Comp. Wt. % | | |
| Butane | 0.9 | 5.5 |
| Butenes | 57.2 | 0.0 |
| Total Dienes | 0.1 | 0.0 |
| Pentane | 1.3 | 0.0 |
| Pentenes | 35.2 | 0.0 |
| Hexanes | 0.1 | 0.0 |
| Hexenes | 5.3 | 0.0 |
| Heptenes | 0.0 | 0.1 |
| n-Heptane | 0.0 | 0.0 |
| Octenes | 0.0 | 94.3 |
| Nonenes | 0.0 | 0.1 |
| Decenes | 0.0 | 0.0 |
| Total | 100.0 | 100.0 |

TABLE 15

| Product Carbon Number | Wt % Selectivity |
|---|---|
| C6 | 1.5% |
| C7 | 1.7% |
| C8 | 41.0% |
| C9 | 12.1% |
| C10 | 6.0% |
| C11 | 3.8% |
| C12 | 16.8% |
| C13-15 | 8.8% |
| C16 | 6.8% |
| C17+ | 1.5% |

Example 12

Figure 6:
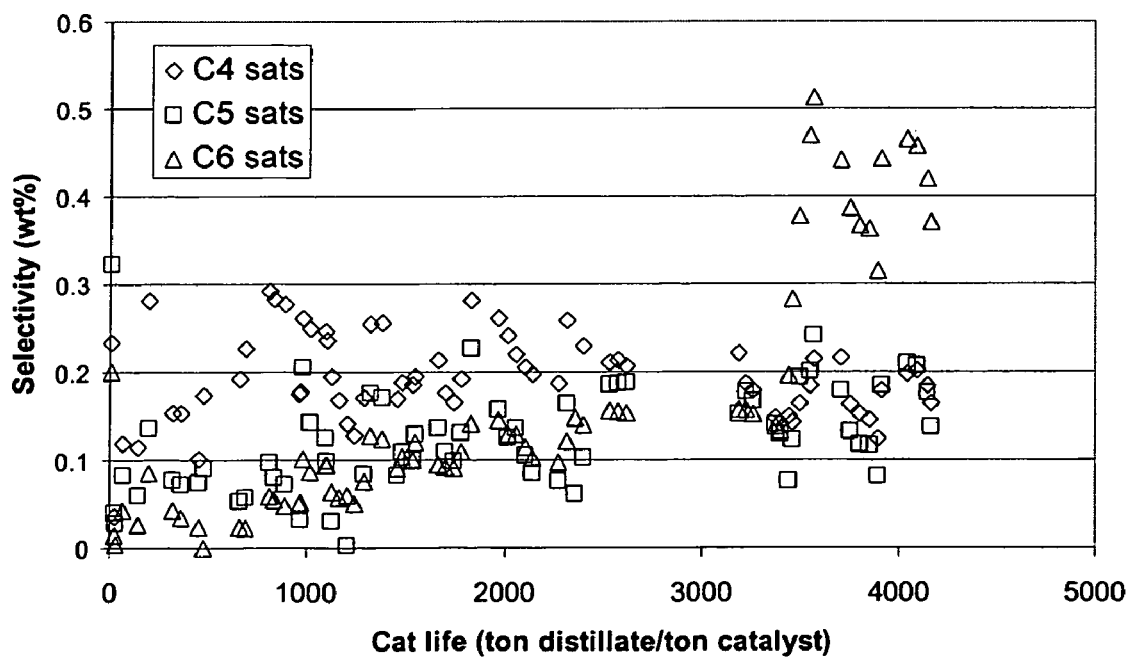
FIG. 6 is a plot showing a relationship between the selectivity of $C_4$, $C_5$, and $C_6$ saturates and catalyst life for products made by processes according to the invention.

During the oligomerization experiments detailed in Example 1, the oligomerization effluent was analyzed for the presence of $C_4$, $C_5$, and $C_6$ saturates. The selectivity of the oligomerization reaction to these saturated components is provided in FIG. 6. The x-axis is shown in terms of tons of distillate produced (within the composition as defined herein) per ton of catalyst employed (catalyst comprising the total of the active material and binders, etc.).

Example 13

During the oligomerization experiments detailed in Example 2, the $C_8$ and $C_9$ saturates in the olefinic recycle stream were measured. The concentration of $C_8$ saturates was between 4 and 5 wt %, and the concentration of $C_9$ saturates was between 1 and 2 wt %. In the case of the $C_8$ saturates, the composition is representative of a build-up by a factor of about 30 times of given the relatively high recycle proportion (corresponding to a very low purge draw) of $C_4$-$C_8$ material from the oligomerization reaction system. Thus, the per pass oligomerization reaction selectivity to $C_8$ saturates was relatively low at between about 0.1 wt % and about 0.2 wt %. Per pass oligomerization reaction selectivities for $C_7$ and $C_9$ saturates are estimated to be in a similar or even lower range than $C_8$ saturates given their lower concentration in the olefinic recycle stream.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of making a hydrocarbon composition comprising:
   a) providing a first feedstock containing olefins comprising at least 1.0 wt % butenes, at least 1.0 wt % pentenes, and at least 1.0 wt. % hexenes, and containing a first content of dienes that is greater than 4000 wppm, such that the dienes comprise at least 10 wppm of a $C_4$ diene and at least 10 wppm of a $C_5$ diene, and no greater than 2.0 wt % of oxygenates;
   b) contacting the first feedstock with a hydrogenation catalyst in the presence of hydrogen to form a second feedstock containing olefins and containing a second content of dienes that is at least 100 wppm and less than 4000 wppm total dienes;
   c) contacting the second feedstock and an olefinic recycle stream with a molecular sieve catalyst in a reaction zone under conditions sufficient to oligomerize the olefins, the oxygenate content in the second feedstock within about 500 wppm of the oxygenate content in the first feedstock, wherein the contacting is such that:
      (i) the olefinic recycle stream and the second feedstock are present in a weight ratio of about 0.1 to about 3.0,
      (ii) the conditions in the reaction zone comprise a WHSV of at least 1.0, based on the olefins contained in the second feedstock, and
      (iii) the reaction zone exhibits a temperature range comprising a difference between a highest temperature and a lowest temperature, wherein the difference is 40° F. (22° C.) or less, thus producing an oligomerization effluent stream; and
   d) separating the oligomerization effluent stream into at least the olefinic recycle stream and a hydrocarbon product stream, such that the olefinic recycle stream contains no more than 10 wt % of $C_{10+}$ non-normal olefins, and such that the hydrocarbon product stream contains from 1 wt % to 30 wt % of $C_9$ non-normal olefins and at least 70 wt % of components boiling at a temperature from about 365° F. to about 495° F. (about 185° C. to about 257° C.).

2. The method of claim 1, wherein the hydrogenation catalyst comprises a noble metal-containing catalyst.

3. The method of claim 1, wherein the second content of dienes is no greater than 2500 wppm total dienes.

4. The method of claim 1, wherein the olefins in the first feedstock comprise no greater than 70 wt % butenes.

5. The method of claim 1, wherein the dienes in the first feedstock comprise no greater than 60 wt % $C_4$ dienes.

6. The method of claim 1, wherein the olefins in the first feedstock comprise no greater than 50 wt % pentenes.

7. The method of claim 1, wherein the dienes in the first feedstock comprise no greater than 60 wt % $C_5$ dienes.

8. The method of claim 1, wherein the olefins in the first feedstock comprise no greater than 50 wt % hexenes.

9. The method of claim 1, wherein the dienes in the first feedstock further comprise: (i) at least 10 wppm $C_6$ dienes, (ii) no greater than 60 wt $C_6$ dienes, or (iii) both (i) and (ii).

10. The method of claim 1, wherein the olefins in the first feedstock further comprise: (i) at least 1.0 wt % propylene, (ii) no greater than 50 wt % propylene, or (iii) both (i) and (ii).

11. The method of claim 1, wherein the first feedstock further comprises: (i) at least 10 wppm methyl acetylene, (ii)

at least 10 wppm propadiene, or (iii) at least 10 wppm of combined methyl acetylene and propadiene.

12. The method of claim 1, wherein the olefins in the first feedstock further comprise: (i) at least 1.0 wt % $C_7$ dienes, (ii) at least 1.0 wt % $C_8$ dienes, or (iii) both (i) and (ii).

13. The method of claim 1, wherein the dienes in the first feedstock further comprise one or more of the following: (i) at least 10 wppm $C_7$ dienes, (ii) at least 10 wppm $C_8$ dienes, (iii) at least 10 wppm of combined $C_7$ dienes and $C_8$ dienes, iv) no greater than 60 wt % $C_7$ dienes, (v) no greater than 60 wt % $C_8$ dienes, and (vi) no greater than 60 wt % of combined $C_7$ dienes and $C_8$ dienes.

14. The method of claim 1, wherein the first feedstock comprises no greater than 10 wt % $C_{9-}$ hydrocarbons.

15. The method of claim 1, wherein the first feedstock comprises no greater than 1.0 wt % $C_2$ hydrocarbons.

16. The method of claim 1, wherein the first feedstock comprise less than 65 wt % saturates.

17. The method of claim 16, wherein the first feedstock comprises less than 15 wt % saturates.

18. The method of claim 1, wherein the first feedstock is derived from an oxygenates-to-olefins process.

19. The method of claim 1, wherein the oxygenates comprise at least one of dimethyl ether, methanol, acetone, and ethanol.

20. The method of claim 1, wherein the combined amount of dimethyl ether, methanol, acetone, and ethanol comprises at least 50 wt % of the oxygenate content.

21. The method of claim 1, wherein the hydrogenation catalyst comprises a noble metal selected from the group consisting of nickel, palladium, platinum, and combinations thereof.

22. The method of claim 1, wherein the hydrogen and the first content of dienes in contacting step (b) are present in a molar proportion of hydrogen to diene species in the first feedstock of from about 1.0 to about 5.0.

23. The method of claim 1, wherein the contacting of the first feedstock with a hydrogenation catalyst in the presence of hydrogen occurs such that the olefins have a WHSV from about 1.0 to about 8.0.

24. The method of claim 1, wherein the contacting of the first feedstock with a hydrogenation catalyst in the presence of hydrogen occurs at a pressure from about 100 psig to about 500 psig.

25. The method of claim 1, wherein the contacting of the first feedstock with a hydrogenation catalyst in the presence of hydrogen occurs at a temperature from about 100° F. (38° C.) to about 300° F. (149° C.).

26. The method of claim 1, wherein the contacting of the first feedstock with a hydrogenation catalyst in the presence of hydrogen occurs in a reaction zone across which a temperature difference exists of no greater than 50° F. (28° C.).

27. The method of claim 1, wherein the first feedstock has a first saturates content and the second feedstock has a second saturates content that is within 5 wt % of the first saturates content.

28. The method of claim 1, wherein the second feedstock has a hydrogen content no greater than 10 wppm.

29. The method of claim 1, wherein the molecular sieve catalyst comprises a 10-member pore ring structure or a 12-member pore ring structure.

30. The method of claim 1, wherein the molecular sieve catalyst is selected from the group consisting of ZSM-5, ZSM-12, ZSM-22, ZSM-57, MCM-22, intergrowths thereof, and combinations thereof.

31. The method of claim 1, wherein the hydrocarbon product stream further comprises: (i) at least 92 wt % of $C_9$-$C_{20}$ non-normal olefins; (ii) at least 92 wt % of $C_9$-$C_{20}$ non-normal saturates; or (iii) both (i) and (ii).

32. The method of claim 1, further comprising:
(e) contacting the hydrocarbon product stream with a source of hydrogen to form a saturate product having an aliphatic hydrocarbon content of at least 80 wt %.

* * * * *